United States Patent
Holst Aagaard Madsen et al.

(10) Patent No.: US 12,440,115 B2
(45) Date of Patent: Oct. 14, 2025

(54) SYSTEM AND METHOD FOR IDENTIFYING AN ABNORMAL PERFUSION PATTERN

(71) Applicant: Perfusion Tech ApS, København Ø (DK)

(72) Inventors: Mads Holst Aagaard Madsen, Copenhagen (DK); Morten Asp Vonsild Lund, Copenhagen (DK); Erik Bærentsen, Copenhagen (DK)

(73) Assignee: Perfusion Tech ApS, København Ø (DK)

( * ) Notice: Subject to any disclaimer, the term of this patent is extended or adjusted under 35 U.S.C. 154(b) by 104 days.

(21) Appl. No.: 18/573,695

(22) PCT Filed: Jun. 24, 2022

(86) PCT No.: PCT/EP2022/067381
§ 371 (c)(1),
(2) Date: Dec. 22, 2023

(87) PCT Pub. No.: WO2022/269051
PCT Pub. Date: Dec. 29, 2022

(65) Prior Publication Data
US 2024/0298913 A1    Sep. 12, 2024

(30) Foreign Application Priority Data
Jun. 24, 2021 (EP) .................................... 21181561

(51) Int. Cl.
*A61B 5/0275* (2006.01)
*A61B 5/00* (2006.01)
*A61B 5/026* (2006.01)

(52) U.S. Cl.
CPC .......... *A61B 5/0275* (2013.01); *A61B 5/0071* (2013.01); *A61B 5/0261* (2013.01); *A61B 5/489* (2013.01)

(58) Field of Classification Search
CPC ..... A61B 5/026; A61B 5/0261; A61B 5/0275; A61B 5/0059; A61B 5/0071
See application file for complete search history.

(56) References Cited

U.S. PATENT DOCUMENTS

| | | | |
|---|---|---|---|
| 6,351,663 | B1 | 2/2002 | Flower et al. |
| 8,976,481 | B1 | 3/2015 | Zeng et al. |

(Continued)

FOREIGN PATENT DOCUMENTS

| | | |
|---|---|---|
| CN | 103619237 A | 3/2014 |
| JP | 2003-510121 | 3/2003 |

(Continued)

OTHER PUBLICATIONS

Liot et al; "Does near-infrared (NIR) fluorescence angiography modify operative strategy during emergency procedures?". Surgical Endoscopy, 2018, Université de Genève. DOI: 10.1007/s00464-018-6226-9. PMID: 29770885.

(Continued)

*Primary Examiner* — Carolyn A Pehlke
(74) *Attorney, Agent, or Firm* — Cesari and McKenna, LLP

(57) ABSTRACT

Disclosed are systems and methods for continuously detecting, and optionally classifying, abnormal perfusion patterns in tissue by means of fluorescence imaging. A computer implemented method for detecting (and/or identifying) one or more areas having an abnormal perfusion pattern in tissue of a subject, for example during a medical procedure, includes: continuously acquiring fluorescence images of the tissue, wherein the fluorescence images are associated with a fluorescent output signal correlated with an input signal defined by a series of boluses of at least one fluorescent imaging agent, and wherein the series of boluses is administered with a predefined and/or controlled duration between subsequent boluses, analyzing the fluorescence images, (Continued)

identifying at least one tissue area with normal perfusion, defining a normal perfusion pattern (in an intensity domain and) in a time domain, and detecting, in the fluorescence images, possible tissue areas with abnormal (non-normal) perfusion pattern.

22 Claims, 19 Drawing Sheets

(56) References Cited

U.S. PATENT DOCUMENTS

| | | |
|---|---|---|
| 9,610,021 B2 | 4/2017 | Dvorsky et al. |
| 2003/0236458 A1 | 12/2003 | Hochman |
| 2004/0167415 A1 | 8/2004 | Gelfand |
| 2005/0033145 A1 | 2/2005 | Graham |
| 2010/0061604 A1 | 3/2010 | Nahm et al. |
| 2010/0069759 A1 | 3/2010 | Schuhrke et al. |
| 2010/0174180 A1 | 7/2010 | Rousso |
| 2012/0155735 A1 | 6/2012 | Friedman et al. |
| 2014/0163403 A1 | 6/2014 | Lenox et al. |
| 2015/0025370 A1 | 1/2015 | Neukirchen |
| 2015/0216443 A1 | 8/2015 | Baier-Lowenstein |
| 2016/0058288 A1 | 3/2016 | Debernardis et al. |
| 2016/0228579 A1 | 8/2016 | Ho et al. |
| 2016/0262638 A1 | 9/2016 | Kamada et al. |
| 2017/0128059 A1 | 5/2017 | Coe et al. |
| 2017/0245766 A1 | 8/2017 | Flower et al. |
| 2017/0266398 A1 | 9/2017 | Murray et al. |
| 2018/0028079 A1 | 2/2018 | Gurevich et al. |
| 2018/0117183 A1 | 5/2018 | Wood et al. |
| 2018/0125378 A1 | 5/2018 | Sund, Sr. et al. |
| 2018/0158187 A1 | 6/2018 | Gurevich et al. |
| 2019/0200869 A1 | 7/2019 | Themelis |
| 2020/0138360 A1 | 5/2020 | Fan et al. |
| 2020/0146564 A1 | 5/2020 | Lund et al. |
| 2020/0405161 A1 | 12/2020 | Flower et al. |
| 2021/0100461 A1 | 4/2021 | Lund et al. |

FOREIGN PATENT DOCUMENTS

| | | | |
|---|---|---|---|
| JP | 2004-528917 | | 9/2004 |
| JP | 2010-505582 | | 2/2010 |
| JP | 2010-233939 A | | 10/2010 |
| WO | WO 2009/092162 | | 7/2009 |
| WO | WO 2018/104552 A1 | | 6/2018 |
| WO | WO 2019/143676 A1 | | 7/2019 |
| WO | WO 2019/238912 A1 | | 12/2019 |
| WO | WO 2021/067563 A1 | | 4/2021 |
| WO | WO-2021099127 A1 * | 5/2021 | ....... A61B 1/000094 |
| WO | WO 2021/123446 A1 | | 6/2021 |

OTHER PUBLICATIONS

Rother et al; "Dosing of indocyanine green for intraoperative laser fluorescence angiography in kidney transplantation". Microcirculation, vol. 24, No. 8, Nov. 1, 2017, p. e12392.
Stein et al; "Colon Resection". Sep. 2015. http://emedicine.medscape.com/article/1891505-print.
Alander et al., "A reveiw of indocyanine green fluorescent imaging in surgery". International Journal of Biomedical Imaging, Hindawi PUblishing Corporation, col. 2012, artick ID 940585, 26 pages.
Boni et al., "Indocyanine green-enhanced fluorescence to assess bowel perfusion during laparoscopic colorectal resection", Surg Endosc (2016) 30:2736-2742.
Degett et al., "Indocyanine green fluorescence angiography for intraoperative assessment of gastrointestinal anastomotic perfusion: a systematic review of clinical trials", Langenbecks Arch Surg (2016) 401:767-775.
James et al., "Fluorescence angiography in laparoscopic low rectal and anorectal anastomoses with pinpoint perfusion imaging—a critical appraisal with specific focus on leak risk reduction", Colorectal Disease, 2015, The Association of Colproctology of Great Britain and Ireland. 17 (Suppl. 3), 16-21.
Kudszus et al., "Intraoperative laser fluorescence angiography in colorectal surgery: a noninvasive analysis to reduce the rate of anastomatic leakage", Langenbecks Arch Surg (2010) 395:1025-1030.
Liu et al., "A stable optic-flow based method for tracking colonoscopy images", 2008 IEEE Computer society Conference on Computer Vision and Pattern Recognition Workshops, Jun. 23-28, 2008, Anchorage, AK, USA, IEEE 2008.
Mortensen et al., "Flourescence guided intraluminal endoscopy in the gastrointestinal tract: A systematic review", World Journal of Gastrointestinal Endoscopy, 12(19), 388-400, 2020.
Nerup et al., "Quantification of fluorescence angiography in a porcine model", Langenbecks Arch Surg, published online Nov. 15, 2016.
Okamoto et al., "A Novel Diagnostic Method for Evaluation of Vascular Lesions in the Digestive Tract Using Infrared Flourescence Endoscopy", Endoscopy, 37(1), 52-57, 2005.
Protyniak et al., "Intraoperative Indocyanine Green Fluorescence Angiography—An Objective Evaluation of Anastomotic Perfusion in Colorectal Surgery", AM. Surg. Jun. 2015; 81(6) : 580-4.
Toens et al., "Validation of IC-VIEW fluorescence videography in a rabbit model of mesentereic ischaemia and reperfusion", Int J Colorectal Dis 2006;21:332-338.

* cited by examiner

SYSTEM AND METHOD FOR IDENTIFYING AN ABNORMAL PERFUSION PATTERN

CROSS REFERENCE TO RELATED APPLICATIONS

This application is the National Stage under 35 U.S.C. § 371 of International Application No. PCT/EP2022/067381, filed Jun. 24, 2022, which claims the benefit of European Patent Application No. 21181561.8 filed on Jun. 24, 2021. The contents of both applications are hereby incorporated by reference herein in their entirety.

The present disclosure relates to systems and methods for continuously detecting, and optionally classifying, abnormal perfusion patterns in tissue by means of fluorescence imaging.

BACKGROUND OF INVENTION

Surgeons increasingly use fluorescence imaging during video assisted surgery to aid their clinical decision-making. Today, fluorescence-guided surgery often encompasses the step of administering a relatively large bolus of an optical contrast agent, for example Indocyanine green (ICG), into a peripheral vein, waiting for distribution in the tissue, and then visually inspecting the tissue to identify regions with either low or high signal intensity. A low or absent signal intensity corresponds to a reduced tissue blood perfusion (i.e. ischemia), whereas a high signal intensity corresponds to normal tissue blood perfusion. In general, it is of interest to know if the patient has a normal blood perfusion in tissues of interest. In particular, this is of importance, since abnormal blood perfusion may be a sign of for example cancerous tissue or inflammatory tissue.

Presently, there is a need for systems and methods that are able to objectively and reliably detect and/or identify areas with abnormal perfusion patterns, such that e.g. cancerous or inflammatory tissue, which is normally indistinguishable from normal tissue to the human eye, can be detected directly during e.g. a surgical procedures.

Another existing method is to assess tissue perfusion by visually assessing a chosen area of interest while the contrast agent is administered. By observing the inflow and outflow of fluorescence, information about tissue perfusion can be inferred. As the inflow-associated increase in signal intensity only takes several seconds, distinguishing between inflow rate and timing in different regions across the image, relying on the visual assessment of the surgeon alone, is almost impossible. Accordingly, a limitation of this approach, is that the perfusion is only characterized in terms of "sufficient" or "inadequate", i.e. it is not a quantitative assessment. Therefore, it is of interest to develop systems and methods that are able to objectively quantify the tissue perfusion e.g. based on the fluorescence inflow and outflow dynamics.

A large limitation common to all existing dynamic applications is that only one predefined area can be visualised per ICG assessment, and that the large dose makes it infeasible to conduct multiple of such measurements without a considerable washout period between the measurements. In practice, this means that existing uses of ICG fluorescence are limited to gathering information from a specific predefined anatomy of interest.

A challenge is that abnormal tissue, e.g. cancerous and inflammatory tissue, is not often indistinguishable from normal tissue to the human eye. Consequently, surgeons often overlook the full extent of the cancer/inflammation, leading to worse outcomes for the patient and possibly progression of disease and reoperation. Another consequence hereof is increased costs in relation to medical staff and hospital services. Another risk with the present methods is that the surgeon removes too much tissue, since the surgeon today has no real-time tools to identify the border between healthy and unhealthy tissue. The surgeons therefore need a tool, which can detect and identify cancerous and inflammatory tissue in a patient, preferably continuously and in real-time. This will allow for a safer and faster tissue dissection, and has the potential to decrease surgical time substantially.

Accordingly, there is a need of a system and method, which is able to identify not only low perfusion and vessel anatomy, but also able to detect and identify abnormal perfusion patterns in tissue in a patient, such as cancerous and inflammatory tissue.

SUMMARY OF INVENTION

The present disclosure solves the above-mentioned demands and challenges by providing a system and method for identifying abnormal perfusion patterns in a subject. This is achieved because the present inventors have realized that normal tissue and abnormal tissue have a different impact on an oscillating input signal, for example in the form of a series of boluses of a fluorescence imaging agent, which implies that the pattern of the fluorescent output signal changes based on the condition of the tissue. In other words, the tissue can be seen as a filter that distorts the input signal, and the presently disclosed method is able to derive information on this filter based on how the input signal is distorted.

The present inventors have previously developed a novel administration regime for fluorescent imaging that allows for continuous perfusion monitoring based on automated administration of time separated micro-boluses of at least one fluorescent agent. This approach creates a fluorescent signal from the perfused tissue that is oscillating in time with a predetermined pattern. This facilitates the ability to track and register tissue perfusion in the background while the surgeon is operating in white light, and alert the surgeon of any deviations in tissue perfusion in the anatomy in the camera focus at any given time. This is further described in the PCT application entitled "System and method for automatic perfusion measurement" pending as PCT/EP2019/065648 (published as WO 2019/238912 A1), which is hereby incorporated by reference in its entirety.

Additionally, the present inventors have previously developed a novel method for identifying blood vessels in tissue of a subject. This method is described in the PCT application entitled "Fluorescent anatomical mapping" pending as PCT/EP2020/087507, which is hereby incorporated by reference in its entirety. This method utilizes the detection of a phase shift of an oscillating fluorescent signal in arteries relative to veins to create a vessel map of superficial tissue in organs or connective tissue, including fat. The vessel map generated from the fluorescent signal may run in the background and can be superimposed onto a white light image, e.g. as augmented reality, at the request of the surgeon.

Accordingly, identified blood vessels can be visualized and mapped to medical personnel, for example before and during tissue dissection. The main advantage is that the automated and continuous blood vessel identification can be executed in the background, while the surgeon is working in his normal white light camera image. The micro-bolus procedure can be started at the initiation of surgery and run in the background, monitored by a computer system that both measures and receives the fluorescent signal, and controls the interval and dosing of the micro-bolus regimen. The surgeon can then, at any time during the surgery, shift to a computer generated "blood vessel view" which shows the blood vessels in the area of interest. Advantageously the continuously identified blood vessels can be superimposed in real time into the white light images such that the otherwise hidden blood vessels appear in the white light images in real time as augmented reality objects.

The present inventors have now realized that the novel administration regime with a varying fluorescent signal from the patient generated from a controlled input signal with many small boluses, can be used to detect tissue areas with abnormal perfusion pattern, e.g. cancerous and inflammatory tissue. This is possible, amongst other things, due to the use of a varying input signal comprising multiple small doses ('micro-boluses') of at least one fluorescent imaging agent such as ICG. It is also possible due to novel methods of analysing the obtained fluorescent output signal from the patient and/or by analysing fluorescent images obtained from tissue of the patient. The presently disclosed method allows for the generation of prior knowledge of each patient's specific "normal" tissue, and further allows to use this knowledge to identify characteristic inflow and outflow patterns of abnormally perfused tissue, such as cancerous and inflammatory tissue. The presently disclosed system and method can then flag this tissue as "abnormally perfused", thereby bringing the tissue into the awareness of the surgeon and ultimately letting the surgeon make an informed decision about how to proceed.

One embodiment of the present disclosure relates to a computer implemented method for detecting (and/or identifying) one or more areas having an abnormal perfusion pattern in tissue of a subject, for example during a medical procedure, the method comprising the steps of acquiring fluorescence images of the tissue, preferably continuously. The fluorescence images are associated with a fluorescent output signal which preferably is correlated with an input signal defined by a series of boluses of at least one fluorescent imaging agent. The series of boluses is preferably administered with a predefined and/or controlled duration between subsequent boluses. The method may further comprise the step of analysing the fluorescence images. At least one tissue area with a normal perfusion pattern can be identified or selected, for example manually, semi-automatically and/or automatically. A normal perfusion pattern can be identified, the identification can be provided in an intensity domain and/or in a time domain. Once a normal perfusion pattern has been determined, possible tissue areas with abnormal (non-normal) perfusion pattern can be detected in the fluorescence images, and thereby abnormally perfused tissue can be detected in the patient.

One way to detect, identify and/or classify tissue areas with normal and/or abnormal perfusion is to utilize the concept of body kernels as described herein. Preferably at least a first body kernel is obtained, wherein said at least first body kernel is the filter imposed by the subjects body on said at least one fluorescent imaging agent in a tissue area with a normal perfusion pattern, and/or least a second body kernel is obtained, wherein said at least second body kernel is the filter imposed by the subjects body on said at least one fluorescent imaging agent in a tissue area with an abnormal perfusion pattern. In that regard the at least first body kernel and/or the at least second body kernel can be seen as at least one transfer function between the input signal and the fluorescent output signal.

Another embodiment relates to a computer implemented method for determining a perfusion related body kernel of tissue in a subject, the body kernel defined as the filter imposed by the subjects body on a (specific) fluorescent imaging agent, comprising the step of continuously acquiring fluorescence images of the tissue, wherein the fluorescence images are associated with a fluorescent output signal correlated with an input signal defined by a series of boluses of said fluorescent imaging agent, and wherein the series of boluses is administered with a predefined and/or controlled duration between subsequent boluses. At least one region of interest (ROI) may be selected in the fluorescence images corresponding to a tissue area. A body kernel of the ROI can then be determined by deconvolving the ROI relative to the input signal, i.e. such that a convolution of the input signal with the body kernel corresponds to the fluorescent output signal from said tissue area. If this tissue area has normal perfusion dynamics, an expected output signal for other tissue areas, e.g. adjacent/proximitized tissue areas, can then be continuously calculated by continuously convolving the controlled and known input signal with the body kernel. Tissue areas with abnormal perfusion dynamics can then be continuously detected and/or monitored, preferably in real-time, because a comparison between the fluorescent output signal and the expected output signal can be provided for substantially any tissue area in the analysed fluorescence images, as long as a suitable body kernel is provided. And such a comparison can almost immediately reveal differences between the fluorescent output signal and the expected output signal—and any difference will provide an indication of an abnormal perfusion pattern. A major advantage of the presently disclosed approach is that it provides a systematic methodology that can be executed in real-time in the background during a medical procedure and continuously analyse the acquired fluorescence images and automatically detect abnormal perfusion patterns and thereby also detect abnormally perfused tissue areas, which can be indicated to the relevant medical personnel, e.g. on a display by means of augmented reality. All that is needed to detect an abnormal perfusion pattern in the acquired fluorescence images is a known (oscillating) input signal and at least one relevant body kernel associated with normal perfusion pattern. And such a relevant body kernel can also be determined automatically during the procedure, e.g. as an initial step.

Yet another embodiment relates to a computer implemented method for establishing a time domain perfusion reference of a subject, comprising the steps of continuously measuring a fluorescent output signal correlated with an input signal defined by a series of boluses of said fluorescent imaging agent, and wherein the series of boluses is administered with a predefined and/or controlled duration between subsequent boluses, and defining the subject specific time domain perfusion reference as the fluorescent output signal vs. time. The subject specific time domain perfusion reference may also be defined as the time difference between bolus injection and corresponding peak fluorescent output signal. The subject specific time domain perfusion reference may be determined with a more simple setup, for example with a photodiode based finger-clip, i.e. without image acquisition, and may function as a clock reference, e.g. for defining and/or identifying a normal perfusion pattern.

Any of the disclosed methods may further comprise the step of identifying blood vessels in the fluorescence images. In the context of this disclosure the perfusion in a blood vessel is not an example of a normal perfusion pattern, because blood vessels are not "tissue". However, it can still be an advantage of identifying where blood vessels are located, such that they are not selected as examples of normal perfusion patterns. Systems and methods for identifying blood vessels in tissue of a subject, e.g. during a medical procedure, is further explained in PCT/EP2020/087507 by the same applicant.

A further aspect of the present disclosure further relates to a system for identifying abnormal perfusion pattern in tissue of a subject, for example during a medical procedure, the system configured for continuously acquiring fluorescence images of the tissue, wherein the fluorescence images are associated with a fluorescent output signal correlated with an input signal defined by a series of boluses of at least one fluorescent imaging agent, and wherein the series of boluses is administered with a predefined and/or controlled duration between subsequent boluses, analysing the fluorescence images, identifying, in the fluorescence images, at least one tissue area with normal perfusion, based on said analysis, defining a normal perfusion pattern in an intensity domain and in a time domain, and detecting, in the fluorescence images, possible tissue areas with an abnormal (non-normal) perfusion pattern.

The presently disclosed system is preferably configured to carry out the methods disclosed herein. This may be provided by the system having at least one processor and memory having instructions stored thereon, which, when executed by the one or more processors, cause the system to carry out any of the presently disclosed methods.

The presently disclosed system and method can be of great use for surgeons during surgery, in any organ and for any indication, in particular where the structure and anatomy of blood vessels might be of interest. The pending application PCT/EP2020/087507 by the same applicant described how a vessel map could be generated in real-time and superimposed onto a white light image, such that the surgeon is able to see otherwise hidden blood vessels in the image.

The present disclosure builds on top of this approach by providing a new functionality, which enables the identification of areas with abnormal perfusion patterns, such that e.g. inflammatory tissue otherwise indistinguishable from normal tissue can be detected directly during e.g. a surgical procedure.

The presently disclosed approach employed within a surgical procedure can be seen as surgical decision support. However, the use of the presently disclosed approach is not limited to use during a surgical procedure. The presently disclosed approach can advantageously also be applied to provide information on blood vessel structure, perfusion maps and anatomy before surgery or after surgery, or even for monitoring of wound healing, blood vessel anatomy and perfusion patterns in patients not undergoing surgery at all. In such cases, the presently disclosed approach can be seen as a medical examination tool, much like a CT-scan.

Various examples are provided herein wherein the optical contrast agent is ICG. However, the presently disclosed approach is not limited to ICG, because many types if contrast agents can be used, even several different contrast agents concurrently, because the presently disclosed body kernel principle applies in general to fluorescent imaging using contrast agents. Various examples of applicable ICG dosing are listed herein. For other contrast agent the same doses might apply, and if not it will not be a challenge to asses relevant does for the other contrast agent, in particular for the contrast agents listed herein. It is a matter of selecting small enough doses such that a fluorescent signal can be detected and such that several boluses can be injected within a time interval of seconds or minutes such that a predefined oscillating input signal is generated that forms the basis of an fluorescent output signal, such that one or more body kernels can be determined.

The present disclosure further relates to a computer program having instructions which, when executed by a computing device or computing system, cause the computing device or computing system to carry out any of the methods disclosed herein.

DETAILED DESCRIPTION OF THE INVENTION

Figure 1A:
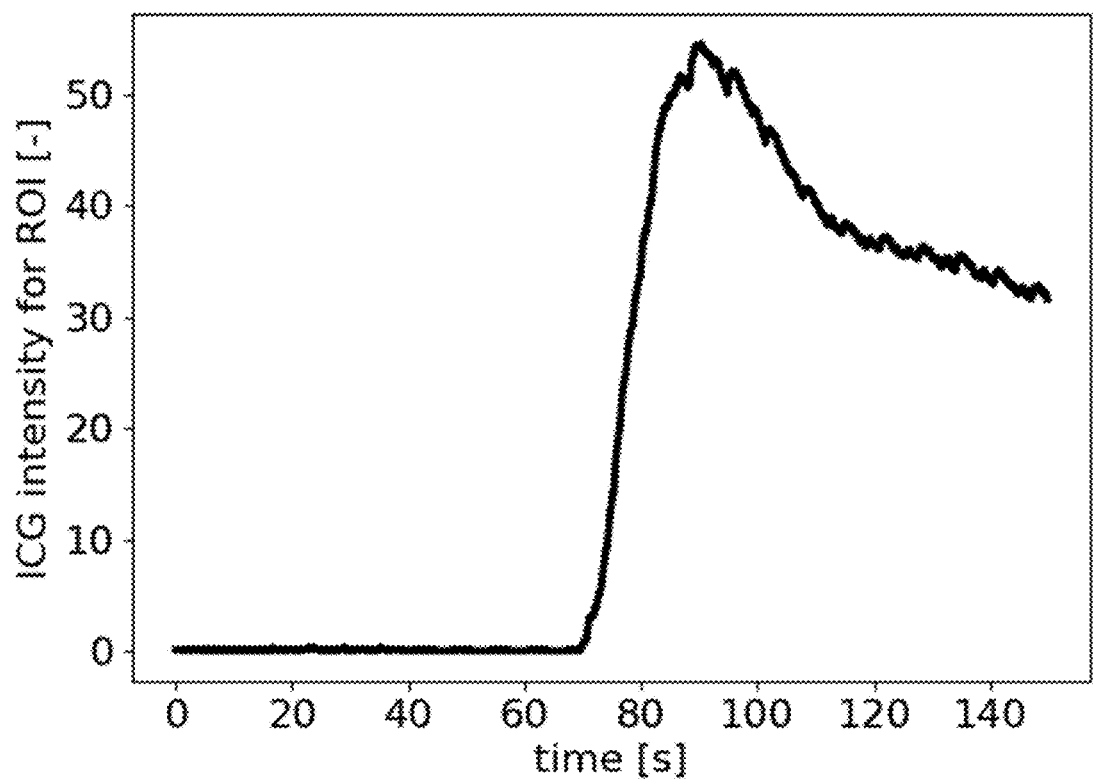
FIG. 1A shows an example of an intensity curve after a bolus of ICG has been provided to a subject and FIG. 1B shows the corresponding intensity curves where the hemodynamic parameters perfusion slope, slope start, slope end max intensity, washout slope, washout start and washout slope end have been calculated and are indicated in the graph.

The input signal as used herein may be characterized by a predefined frequency with a period of between 30 second and 15 minutes, such as between 1 and 10 minutes, or between 1-2, 2-3, 3-4, 4-5, 5-6, 6-8, or 8-10 minutes over a time period of at least 10 minutes, or at least 15 minutes, or at least 30 minutes, or at least 1 hour, or at least 2 hours, corresponding to bolus injections which may be seen as creating a predetermined pattern. The input signal does not necessarily have a fixed and/or constant frequency, as long as the series of boluses is administered with a predefined and/or controlled duration between subsequent boluses. The resulting fluorescent signal can be seen as oscillating in intensity in accordance with this predetermined pattern, at least for blood vessels and/or normally perfused tissue. As also explained herein, this predetermined pattern can originate from a controlled injection of a series of small boluses of at least one fluorescent agent, such as indocyanine green (ICG).

White light images of the tissue may also be continuously received and acquired. Hence, at least one white light image of the tissue may be generated wherein for example identified blood vessels, normally perfused tissue areas, and/or abnormally perfused tissue areas are visually enhanced, e.g. by superimposing the corresponding element into the white light images, preferably also visually enhancing the corresponding elements, e.g. by means of high contrast colours, and displayed on a screen such that the identified blood vessels, normally perfused tissue areas, and/or detected abnormally perfused tissue areas, appear as augmented reality objects.

Intraoperative Fluorescence Imaging

Perfusion (e.g. blood flow) can be imaged intra-operative and assessed in real time using the near-infrared light from a surgical microscope or camera and acquiring video of fluorescent light in the near-infrared region that is excited from a fluorescent vascular imaging agent that has been intravenously administered as a tracer. The state of perfusion during the operation can thereby be confirmed in real-time.

In this disclosure the perfusion in tissue and/or blood vessels is used to identify blood vessels, normally perfused tissue and/or abnormally perfused tissue utilizing fluorescence imaging, but not necessarily limited to intra-operative use of a surgical camera.

The presently disclosed system and method can provide enhanced information of tissue characteristics including location of superficial and deeper blood vessels, normally perfused tissue and/or abnormally perfused tissue, in particular if different fluorescent imaging agents are used, because careful selection of different fluorescent imaging agents provides the option of having perfusion information from different depths in the tissue.

During a medical procedure, e.g. diagnostic, screening, examining and/or surgical procedure involving fluorescence imaging a solvent comprising the fluorescent imaging agent, such as ICG, is injected intravenously and the molecules are excited by an infrared light source, e.g. a laser with a wavelength in the infrared wavelength range, e.g. around 780 nm. Fluorescent light with a wavelength of around 830 nm is then emitted from the excited imaging agent molecules and can be recorded with an imaging device, e.g. in the form of a camera. A filter can be provided to block the excitation light as the excitation intensity typically is much larger than the fluorescence intensity. The excitation intensity can be around 1 W per emission angle whereas the fluorescent power pr. pixel can be around 0.15 pW. In spite of the several orders of magnitude in difference, good Signal to Noise Ratio (SNR) can be achieved. The recorded fluorescent light provides an image of the perfusion in imaged tissue and makes it possible to see deeper, due to a penetration depth of 5-10 mm for ICG. Since the ICG molecule is bound to proteins in the blood, the video images contain information about the level of perfusion—but that information can be difficult to quantify for the surgeon during the operation if only the acquired video images are seen.

In the system and method of the present disclosure, the fluorescent imaging agent(s) may be selected from the group of: indocyanine green (ICG) and fluorescein isothiocyanate, rhodamine, phycoerythrin, phycocyanin, allophycocyanin, ophthaldehyde, fluorescamine, rose Bengal, trypan blue, fluoro-gold, green fluorescence protein, a flavin, methylene blue, porphysomes, cyanine dye, IRDDye800CW, CLR 1502 combined with a targeting ligand, OTL38 combined with a targeting ligand, or a combination thereof.

Indocyanine green (ICG) is a cyanine dye used in medical diagnostics, it is far the most common dye used for perfusion assessment. It has a peak spectral absorption at about 800 nm. These infrared frequencies penetrate retinal layers, allowing ICG angiography to image deeper patterns of circulation than fluorescein angiography. ICG binds tightly to plasma proteins and becomes confined to the vascular system. It is administered intravenously and, depending on liver performance, is eliminated from the body with a half life of about 3-4 minutes by the liver to bile juice. ICG sodium salt is normally available in powder form and can be dissolved in various solvents; 5% (<5% depending on batch) sodium iodide is usually added to ensure better solubility. The sterile lyophilisate of a water-ICG solution is approved in many European countries and the United States under the names ICG-Pulsion, IC-Green and VERDYE as a diagnostic for intravenous use.

The absorption and fluorescence spectrum of ICG is in the near infrared region. Typically a laser with a wavelength of around 780 nm is used for excitation. At this wavelength, it is possible to detect the fluorescence of ICG by filtering out scattered light from the excitation beam.

The toxicity of ICG is classified as low but administration is not without risks, e.g. during pregnancy. It is known that ICG decomposes into toxic waste materials under the influence of UV light, creating a number of still unknown substances. I.e. it is within the interest of the patient that the dose of ICG used during fluorescence imaging is minimized, as demonstrated herein.

Fluorescein is another dye, which is widely used as a fluorescent tracer for many applications. Fluorescein has an absorption maximum at 494 nm and emission maximum of 512 nm (in water). Hence, it would be suitable for use in combination with ICG because the absorption and emission wavelength of the two dyes are separated by several hundred nanometres.

According to one embodiment, the fluorescent imaging agent(s) are attached to a non-normal tissue targeting molecule, such as a tumor-targeting molecule, and given to the subject as a pre-surgery drug. The tumor-targeting molecule will then bind to tumor-tissue inside the subject. Thereby the fluorescent imaging agent(s) that are immobilized to the tumor tissue, will indicate area(s) of tumor tissue (since such areas will shine more bright than other areas), such that these areas can be more easily identified in the images/videos. The tissue need not be tumor tissue, but can be other types of non-normal tissue, e.g. inflammatory tissue. The key aspect is that the fluorescent imaging agent(s) are attached to a molecule that targets the non-normal tissue. Accordingly, this approach can be used in combination with any of the disclosed methods herein to enhance the detection of non-normal tissue.

Two-Type Molecule Combinations

The present disclosure further relates to computer implemented method(s) for detecting (and/or identifying) one or more areas having an abnormal perfusion pattern, wherein at least two fluorescent imaging agents are used to generate two different fluorescent signals simultaneously. The at least two fluorescent imaging agents may be selected from the list of imaging agent(s) provided elsewhere herein. Preferably, the at least two fluorescent imaging agents have different emittance wavelengths, which allows the fluorescence images to be obtained from at least two different depths of the tissue simultaneously. Accordingly, an advantage of using two fluorescent imaging agents (with different emittance wavelengths) is that a layered analysis is provided, wherein images can be obtained from different depths of the tissue simultaneously.

Preferably, the at least two different depths are separated by at least 0.5 cm, preferably at least 1 cm, even more preferably at least 1.5 cm. As an example, the two depths may be 0.5 cm and 2 cm measured from the skin level of the subject. The usage of two different fluorescent imaging agents may be applied to any of the disclosed computer implemented methods herein.

Dose Regime

The present disclosure further relates to a method for automatic perfusion assessment of an anatomical structure of a subject, the method comprising administration into a vein of a bolus of about 1/10 of the normal dose used for perfusion assessment. For Indocyanine green (ICG), the normal bolus is 0.1-0.3 mg/kg body weight. According to the present disclosure a bolus of less than 0.01 mg/kg body weight, preferably less than 0.005 mg/kg body weight, more preferably less than 0.0049 mg/kg body weight of a first fluorescence imaging agent like ICG can be used, even more preferably less than 0.0048 mg/kg body weight, yet more preferably less than 0.0047 mg/kg body weight, most preferably less than 0.0046 mg/kg body weight, and even more preferably less than 0.004 mg/kg body weight of a first fluorescence imaging agent can be used. For other fluorescent imaging agents described herein, the bolus is similarly reduced according to the present disclosure. As stated above the agent may be injected by a controllable injection pump, for example as a series of boluses with a predefined time between subsequent boluses. Following injection of each bolus the fluorescence emission from the anatomical structure can be measured. This method for automatic perfusion assessment of an anatomical structure of a subject can also be combined with the presently disclosed method for continuously identifying blood vessels in tissue, in particular with regard to the bolus administration regime.

The minimum bolus that provides a quantifiable fluorescence emission representative of the perfusion of the anatomical structure and/or identifiable blood vessels can be determined following administering a series of increasing boluses. The bolus may comprise incrementally increasing or incrementally decreasing amounts of the agent, for example the amount may increase or decrease in increments of 10% from one bolus to the subsequent bolus.

The boluses are preferably provided as a regular series of injections with a predefined and regular time interval each bolus. The interval between boluses can be between 5 and 600 seconds, such as between 5 and 300 seconds, such as between 10 and 180 seconds, such as between 10 and 140 seconds, such as between 10 and 90 seconds, such as between 15 and 80 seconds, for example between 20 and 70 seconds, such as between 30 and 60 seconds. In another embodiment, the interval between boluses can be between 5 and 600 seconds, such as between 10 and 600 seconds, such as between 15 and 600 seconds, such as between 15 and 300 seconds, such as between 30 and 240 seconds, such as between 45 and 240 seconds, for example between 90 and 240 seconds, such as between 90 and 120 seconds. Preferably between 60 and 600 seconds, or between 120 and 600 seconds. The interval between boluses is preferably sufficiently long to allow measurement/calculation of one or more perfusion related parameters for each bolus in the anatomical structure, such as perfusion slope, slope start, and washout slope. For boluses injected with very short time intervals it may for example only be possible (and sufficient) to assess the slope start and/or washout slope.

For ICG the amount of fluorescence imaging agent is preferably between 0.0001 and 0.001 mg/kg body weight per bolus, such as between 0.001 and 0.01 mg/kg body weight per bolus, preferably between 0.0005 and 0.005 mg/kg body weight per bolus, more preferably between 0.001 and 0.004 mg/kg body weight per bolus. An initial amount of fluorescence imaging agent is advantageously at least 0.001 mg/kg body weight, and preferably less than 0.005 mg/kg body weight. Subsequent boluses may then increase by at least 0.001 mg/kg body weight and preferably less than 0.005 mg/kg body weight per bolus from one bolus to the subsequent. For other types of fluorescence imaging agents the dose is preferably chosen based on its fluorescence relative to ICG. Therefore a fluorescence imaging agent having higher emission rates is preferably administered at a correspondingly lower dose. The dose may for example be substantially inverse linear to the quantum yield of the fluorescence imaging agent. The dose may further be based on the absorption and emission spectra relative to ICG.

The bolus is preferably a liquid volume of between 0.5 µL and 10 mL, such as from 0.5-5 mL. I.e. the amount of the first fluorescence imaging agent is preferably dissolved in a liquid, typically water. In one embodiment, a volume of isotonic solution (such as saline) is injected immediately following injection of a bolus of fluorescence imaging agent, for example wherein the volume of isotonic solution is 1-20 mL, such as 2.5-15 mL, for example 5-10 mL. A subsequent injection of a volume of isotonic solution can typically be applied if the bolus is injected in for example a peripheral vein.

In a further embodiment of the present disclosure, a second fluorescence imaging agent is administered, the second fluorescence imaging agent having an emission maximum differing from the emission maximum of the first fluorescence imaging agent by at least 50 nm, or by at least 100 nm. The first and second fluorescence imaging agents are preferably administered alternatingly. Advantageously the interval between administrations of different fluorescence imaging agents is half of the interval between subsequent administrations of the same fluorescence imaging agent.

In a further embodiment of the presently disclosed method, a series of fluorescence images of the anatomical structure and/or tissue is formed for the assessment of perfusion and/or for identification of blood vessels. The fluorescence may be detected automatically by illuminating the anatomical structure/tissue with a light source capable of exciting the fluorescence imaging agent, and the emission is quantified and/or analysed through a series of fluorescence images of the anatomical structure/tissue.

The period between boluses can be determined by a computer configured to detect the perfusion slope caused by each bolus. Further, the amount of fluorescence imaging agent in a bolus may be controlled by a computer configured to determine a minimum bolus corresponding to a minimum fluorescence emission representative of the perfusion of the anatomical structure. This computer may be part of the presently disclosed system.

In a further embodiment, the perfusion assessment comprises localizing a perfusion complication in the anatomical structure. Hence, the perfusion assessment may be used in connection with a diagnostic or surgical procedure, for example the procedure comprises diagnostic laparoscopy, explorative laparoscopy, surgical laparoscopy with traditional laparoscopy, robotic surgery, and open surgery. The procedure may alternatively comprise creation of anastomosis, such as intestinal anastomosis, wounds, plastic surgery, cardiac surgery or cancer.

A further embodiment of the present disclosure relates to a fluorescence imaging agent for use in the methods disclosed herein. Yet a further embodiment relates to the use of a fluorescence imaging agent in the preparation of a medicament for use in a method of automatic perfusion assessment and/or continuous identification of blood vessels as disclosed herein.

In a further embodiment of the present disclosure, the fluorescence imaging agent is repeatedly injected. In certain cases, there may be a need for a longer phase, such as at least 2 minutes, preferably at least 3 minutes, even more preferred at least 4 minutes, yet even more preferred at least 5 minutes, almost most preferably at least 8 minutes, most preferably at least 10 minutes, wherein the fluorescence imaging agent is not injected, in order to allow for the fluorescence imaging agent to be washed out, such that the background level is reduced. Once the background level is reduced to an acceptable level, such as below a certain percentage of the maximum fluorescent intensity or until substantially no fluorescent can be measured, the injections of the fluorescence imaging agent may be continued.

Oscillating Dynamics

The inventors have previously realized that the measurement and analysis of repeatable bolus injections can additionally be expanded from interpretation and quantification of a single inflow and/or a single outflow phase to analysis of oscillating fluorescence dynamics. This controlled variation of the fluorescence dynamics due to control of the input signal, may disclose physical perfusion characteristics hitherto unattainable without invasive measures. The input signal is like Morse that is sent into the body and the measured fluorescence dynamics, and in particular the analysis of the fluorescence dynamics in combination with the known input signal, provides new information about perfusion patterns in the examined tissue.

The presently disclosed system and method may be configured for controlled injections of small boluses, such as the minimum bolus, at regular intervals, thereby creating the input signal. These boluses may, depending on for example the injection time interval, lead to a cyclic variation in the input signal that when measured takes the approximate form of a sinusoidal curve. In such a curve, the measured intensity signal is expected to increase with the inflow of the fluorescence imaging agent from a given bolus, and thereafter decrease during the wash-out phase of the bolus, until it once again increases at the subsequent bolus and so forth, resulting in a cyclic (sinusoidal) pattern.

In one embodiment the presently disclosed system can be configured such that it can recognize parameters of the oscillating intensity curve, such as the frequency and/or amplitude. The trained system can then in turn anticipate both the direction and regularity of the forthcoming signal dynamics. The system preferably uses measured values in order to recognize the oscillating pattern, such that the system thereafter is able to detect discrepancies between measured values and expected values. The measured values may further be continuously used for improving the pattern recognition, i.e. the expected values. Alternatively or additionally, injection parameters such as the bolus frequency, dose and flow rate may be used for determining the expected values, i.e. the oscillating pattern.

With the system anticipating the expected value, it is able to, at an early time point—ideally instantaneously, detect and alert the onset of ischemic conditions. The detection of ischemic conditions may be a function of the expected value(s) and the detected value(s), such as for example a threshold value. However, with the presently disclosed approach of continuously identifying blood vessels, an ischemic condition, or any type of disruption or breach in a blood vessel or a network of blood vessels, can be observed visually almost instantaneously by the relevant medical personnel.

Figure 4:
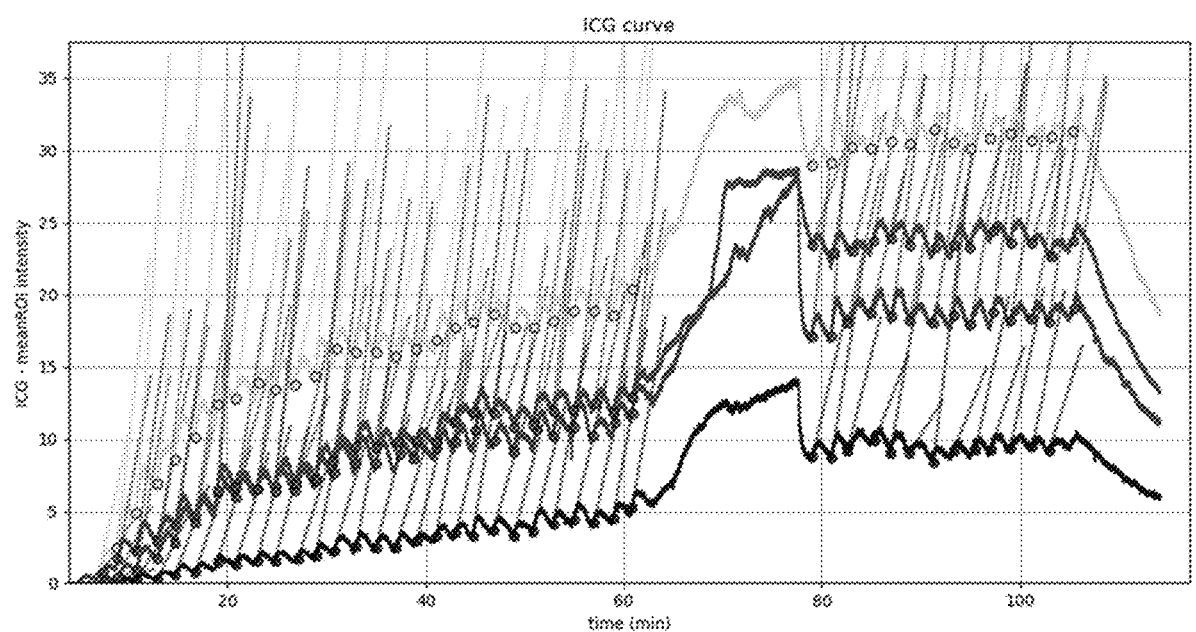
FIG. 4 shows measurements of a human, subjected to venous occlusion, wherein the blood flow is only partially restricted.

Discrepancies from the expected sinusoidal pattern may be caused by for example the onset of ischemic conditions in at least a part of an anatomical structure/tissue visible in the video image, or by a regional change in perfusion to a given area. An explanatory figure, demonstrating this change in dynamics due to the onset of ischemia in a human subject, is given in FIG. 2A and a more narrow zoom is given in FIG. 2B. As seen, it is possible to detect the transition from the regular oscillatory fluorescent signal to the ischemic flatline. It should however be noted that a change to the perfusion of the anatomical structure of interest may result in other measured patterns, additional to an ischemic flatline. An example is venous occlusion, wherein the outflow of blood from an anatomical area is blocked or reduced leading to a change in the oscillating dynamics due to congestion or pooling of fluorescent agents in the given area. As can be seen in FIG. 4, while the cyclic oscillations cease the result is not a flatline.

However, the presently disclosed system and method may also be configured for controlled injections of small boluses, such as the minimum bolus, at non-regular intervals—as long as the injection of boluses is controlled such that the generated input signal is controlled and known. The presently disclosed body kernel approach makes it possible to calculated an expected signal as long as the input signal is known. Hence, in that regard the presently disclosed approach is not dependent on a regular and input signal.

The systems described herein can observe and detect changes in the perfusion level of a given area in the video image within seconds. This can be detected in an area which has been observed for a prolonged time, such as many minutes, where the dynamics have been visualized continuously and where the expected signal can be calculated continuously. An explanatory figure highlighting the difference between signals one can expect to observe for ischemic/healthy tissue areas is shown in FIG. 2C. However, it can equally be determined in an anatomical area which has only been visualized during a short time interval, e.g. 10-20 seconds, as the described system is trained to expect and detect a certain phase of the regular dynamic signal at a given time in the tissue, consisting of regular rises and falls in the time-intensity signal. Cf. FIG. 2D illustrating how it may look if the anatomic region of interest drifted in and out focus of the recorded image.

Preferably, the presently disclosed approach can take advantage of tracking technology that can be capable of running independently in the background, while a surgeon is only exposed to the visible white light signal, and thus only interrupted/notified by warning signals. During for example the detection of an abnormal perfusion pattern.

Oscillating Input Signal

The presently disclosed methods utilize an input signal that is varying in bolus volume vs. time. An input signal is hence defined by a series of boluses of at least one fluorescent imaging agent, and wherein the series of boluses is administered with a predefined and controlled duration between subsequent boluses. One way of providing an oscillating input signal is to inject micro-boluses of a fluorescent imaging agent, such as indocyanine green (ICG), at predefined and regular or non-regular intervals over a period of time such that the input signal will oscillate in accordance with bolus injections. The bolus volume may be constant, but can also be varied controllably for one or more of the boluses. Injection at regular intervals with provide an input signal with a predetermined frequency.

Accordingly, the input signal may be defined in terms of volume of fluorescent imaging agent versus time. The fluorescent imaging agent may be injected intravenously, and the imaging agent may be excited by a light source with a wavelength or wavelength range suited to excite the imaging agent as described previously. The micro-boluses makes it possible to continuously inject the fluorescent imaging agent at controllable, predetermined and/or regular or non-regular intervals over a period of one hour or even several hours, e.g. at regular intervals of between 1 and 10 minutes, e.g. 1-2 minutes, 2-3 minutes, 3-4 minutes, 4-5 minutes, 5-6 minutes, 6-8, minutes or 8-10 minute intervals. In one embodiment, the duration between subsequent boluses is between 5 seconds and 10 minutes over a time period of the medical procedure, which can range from minutes to hours. Accordingly, the input signal is preferably defined by a series of boluses of at least one fluorescent imaging agent, wherein the series of boluses is administered with a predefined and/or controlled duration between subsequent boluses. The series of boluses of at least one fluorescent imaging agent may be provided into a vein of the subject during the image acquisition thereby generating the input signal.

Acquiring Fluorescence Images

A first step of the disclosed computer implemented methods is preferably the acquisition of fluorescence images of an anatomical structure/tissue of a subject. Additionally or alternatively, a first step may be the acquisition of a fluorescent output signal from tissue of a subject. The fluorescence may be detected automatically by illuminating the anatomical structure/tissue with a light source capable of exciting the fluorescence imaging agent, wherein the emission is quantified and/or analysed through a series of fluorescence images of the anatomical structure/tissue. Any of the disclosed methods may comprise the step of analysing the fluorescence images and/or analysing the fluorescent output signal, for example detecting at least one peak fluorescent signal for each bolus.

Calculation of Body Kernels

In general, all of the disclosed methods herein rely on the presence of an input signal, which is introduced into the body of a subject (e.g. intravenously). The input signal is oscillating in time and comprises a series of micro-boluses (aka micro doses), each of said micro-boluses comprising a fluorescent agent as described in more detail previously. In general, the input signal will be smeared out over time when passing through the body, and the measured fluorescent output signal will be a distorted or altered version of the input signal because of the influence of the body. This is illustrated in FIGS. 11-14. The degree of smearing/distortion depends on the body and which body part is investigated using the presently disclosed method. As an example, fingers and toes are placed far from the heart and consequently influences the input signal differently (i.e. gives a different response) than body parts closer to the heart. One can think of the body/body part in this regard as a filter, which influences the input signal.

A body kernel should be understood herein as a function, which represents or describes how the body influences the input signal, i.e. the body kernel may be seen as the aforementioned filter. In general, the body kernel is not known a priori. However, the present inventors have realized that the body kernel can be estimated based on the measured fluorescent signals from the body—because the input signal is known.

The inspiration comes from the fields of image processing and signal processing. In image processing a kernel, aka convolution matrix, or mask, is a small matrix which is used for blurring, sharpening, embossing, edge detection, and more. This is accomplished by doing a convolution between a kernel and an image. Convolution is a type of matrix operation and is the process of adding each element of an image to its local neighbours, weighted by the kernel.

In normal image processing a kernel is applied to an image in order to extract more information from the image, i.e. the kernel is known in advance. In the context of this disclosure the body kernel is convoluted with the input signal in order to predict the output signal—and thereby detect abnormally perfused tissue areas. However, the actual body kernel is typically not known, because it depends on the circumstances. Hence, one aspect of the present disclosure relates to determination of a body kernel, where deconvolution comes in play.

Deconvolution is the operation inverse to convolution. As stated above convolution can be used to apply a filter in image processing, and when knowing the filter, deconvolution can be applied to recover the original signal. In microscope imaging deconvolution is an image processing technique utilized for improving the contrast and resolution of digital images captured in the microscope.

Within image processing the objective of deconvolution is typically to find the solution f of a convolution equation of the form: f*g=h, where h is some recorded signal, and f is some signal that one wish to recover, but the signal f has been convolved with a filter or distortion function g, before it was recorded. The function g might represent the transfer function of an instrument or a driving force that was applied to a physical system.

In this case f represents the known input signal and h represents the measured output signal, and the function g then represents the body kernel. With knowledge of the body kernel g it is possible to predict the output signal h, because the input signal f is controlled and thereby known. And when the output signal can be predicted it is also possible to detect normal perfusion patterns and/or abnormal perfusion patterns, for example if the predicted output signal represents a normal perfusion pattern. And thereby it becomes possible to identify and/or detect normally and/or abnormally perfused tissue areas. And one way to get there is to determine the body kernel, for example by means of applying deconvolution, which is a well-known technique.

Hence, a body kernel defined as the filter imposed by the subjects body on a fluorescent imaging agent, can be determined by deconvolving the measured fluorescent signal from the tissue (e.g. a region of interest of the tissue), whereby a body kernel of the ROI is obtained. The deconvolution (in time) can be performed in various ways known in the art, for example through an optimization formulation or in Fourier space. In that regard the body kernel can be seen as a transfer function between the input signal, i.e. the boluses of the fluorescent agent, and the fluorescent output signal, for example the fluorescent images and the analysis thereof. The estimation of body kernels is exemplified in FIGS. 11-15 (using synthetic data) and FIG. 16 (using real life data). For example by continuously acquiring fluorescence images of the tissue, wherein the fluorescence images are associated with a fluorescent output signal correlated with the input signal as defined herein. At least one region of interest (ROI) can be selected in the fluorescence images, either manually, semi-automatically and/or automatically; by deconvolving the ROI relative to the input signal a body kernel of the ROI can be determined, such that a convolution of the input signal with the body kernel corresponds to the fluorescent output signal from the ROI. The duration between subsequent boluses may be selected in accordance with the type of tissue of the ROI.

One subject, i.e. patient, may have a multitude of body kernels, wherein each body kernel represents how a particular body part influences the input signal. Accordingly, body kernels can be seen as having a spatial dependence, i.e. a local phenomenon. Hence, different body parts/regions of interest of the same subject may be associated with different body kernels. However, in a series of fluorescence images showing tissue of a subject, most of the tissue is usually normally perfused, and in that regard it is possible to determine a single body kernel representing the normal perfusion pattern of the normally perfused tissue. Such a single body kernel may be generated from an average or median or the like from a plurality of regions of interest, a plurality of tissue areas, or simply a plurality of pixels. In that regard it is noted that blood vessels can be identified and "removed" from determination of the body kernel, because the blood vessels do not represent normally perfused tissue. The body kernel can be represented mathematically as a matrix in one or two (or more) dimensions.

The use of body kernel(s) is a major advantage, since it provides systematic knowledge on what the expected fluorescent output signal from the tissue should look like. Consequently, this improves the speed of the method, since the measured signal can be compared, possibly in real-time, to the calculated expected output signal, rather than not knowing what to expect. The expected output signal is calculated by convolving the input signal with the relevant body kernel. Once a body kernel is estimated for a particular area of interest, for example for a normally perfused area, said body kernel can be used in combination with the known input signal to calculate an expected output signal, compare to the corresponding fluorescent output signal and thereby detect abnormal perfusion patterns. The assessment of the similarity between the measured fluorescent output signal and the expected output signal can be done using a variety of mathematical methods to compare e.g. two graphs/curves or two images. Similarity in this context could be understood as for example as, the distance between the graphs/curves, e.g. measured as the root-mean-square difference between the functions, weighted least squares between curves (WLS), Hausdorff distance, difference-area spanned between the two curves, chi square, or in general the phase or frequency, in particular frequency composition, and/or amplitude of the compared signals/curves. However, as also stated herein the detection, identification and/or classification of normal and/or abnormal perfusion pattern and/or areas comparison can also be provide by a comparison/match on the body kernel level, which in many instances may be the preferred option, because body kernels in essence are independent of the input signal.

Defining Normal Perfusion and Identifying Abnormal Perfusion

In order to detect an abnormal perfusion pattern it is usually necessary to define a normal perfusion pattern. Therefore, the presently disclosed method(s) preferably comprise a step of defining a normal perfusion pattern, e.g. by identifying a tissue area with normal perfusion. The present inventors have found multiple ways of identifying and defining normal perfusion. The different approaches are described in the following.

One way of estimating normal perfusion is a manual definition of normal perfusion. According to an embodiment of the presently disclosed method, at least one tissue area with normal perfusion is identified manually, e.g. by a surgeon selecting a tissue area to have normal perfusion. In this approach, the surgeon or doctor simply selects a tissue area, which is deemed to have normal perfusion, i.e. a visual assessment. This will be evaluated on the basis of the experience of the surgeon/doctor, and has the drawback that the assessment is not completely objective. Once the area is designated, a spatially located body kernel can be estimated for the area.

Subsequently, the body kernel of the area deemed to have normal perfusion can be convolved with the input signal to calculate the expected output signal, the output signal that is expected from a tissue area having normal perfusion. A fluorescent output signal from an area having abnormal perfusion, e.g. due to inflammation, will deviate from the expected output signal. Hence, by comparing the fluorescent output signal to the expected signal, areas of abnormal perfusion can be detected/identified. Accordingly, one embodiment of the disclosed method(s) further comprises the steps of determining a body kernel of at least one region of interest (ROI) in the fluorescence images and convolving the input signal with the body kernel thereby defining a normal perfusion pattern of said ROI.

Another way of estimating normal perfusion, is to analyse the fluorescent output signals from a plurality of areas/ regions of interest, distributed over different areas in the images. If the fluorescent output signals of a plurality or these areas are substantially similar, it can be assumed that these areas represent normal perfusion patterns, and one or more relevant body kernels can be determined. This approach differs from the first approach in that one or more relevant body kernels can be determined automatically. Spatially local body kernels can be determined for each area assigned as normal perfusion, and such local body kernels may be assigned a spatial trust region in which it is deemed valid for signal prediction. Conversely, areas that provides output signals that correlate with the calculated expected output signal within a predefined tolerance may be considered as having normal perfusion pattern.

Yet another way of identifying, or assisting in identifying, normal perfusion is to have a reference detection elsewhere on the body of the patient. As an example, in case a surgeon is operating an arm of a patient, the reference may be obtained on the finger of the patient, e.g. using a light-diode finger clip. The light-diode finger clip may be similar to those used for pulse and blood oxygen level measurements (i.e. a pulse oximeter). The light-diode finger clip should have a wavelength corresponding to the peak absorption frequency of the used fluorescent imaging agent (e.g. ICG) in the tissue and it should preferably further comprise an excitation light source and a photosensitive element with a peak sensitivity at a wavelength emitted by the fluorescent imaging agent. This allows the intensity of the fluorescent signal to be measured transcutaneously. Accordingly, one embodiment of the disclosed method(s) comprises the step of measuring the intensity of the fluorescent output signal in a transcutaneous manner by other means than image acquisition, for example using a photodiode and/or a light-diode finger clip. The intensity is preferably measured continuously, i.e. as the intensity versus time. In this approach, the reference signal obtained by the light-diode finger clip is considered to be representative of a normal perfusion pattern. This can be compared to the fluorescent output signal from one or more regions of interest in the acquired fluorescence images. The regions of interest that compare well to the transcutaneously measured signal, e.g. in terms of phase, frequency composition, and/or amplitude, can be considered to represent tissue areas with normal perfusion pattern and one or more relevant body kernels can then be determined. This approach can thereby also identify normal perfusion automatically.

Another, or supplementary way of defining normal perfusion and/or a normal perfusion pattern is by comparing to previous fluorescence output signal, e.g. a database of fluorescence output signals labelled as having a normal perfusion pattern, possibly also labelled in terms of the type of tissue and/or anatomical area that is being examined. Again the presently disclosed kernel approach can be applied wherein labelled body kernels have been generated for normally perfused tissue areas, such that a database of labelled body kernels exists. One or more of these labelled body kernels can then be directly applied as a way to define a normal perfusion pattern in the presently disclosed approach.

Alternatively, or supplementary, when an normal perfusion pattern is to be identified, a plurality of normally labelled body kernels can be convolved with the present input signal to generate a plurality of expected output signals for normally perfused tissue, which can be compared to the present fluorescent output signal, such that one or more normal perfusion patterns can be identified in one or more regions of interest in the fluorescent output images, thereby identifying one or more tissue areas that are normally perfused. One or more body kernels representing normally perfused tissue can then be generated based on the input signal and the fluorescent output signal from the normally perfused tissue areas.

Hence, there are many ways to automate the identification of a normal perfusion pattern.

Classification of a Perfusion Pattern

The present disclosure further relates to a method for classifying an abnormal perfusion pattern, i.e. such that the associated tissue area identified as abnormally perfused can be classified, e.g. in classified terms of the cause of the abnormal perfusion pattern, e.g. it may be classified as cancerous tissue, glandular tissue, thyroid tissue, tumor tissue, inflammatory tissue, ischemic tissue, etc. Tumor tissue can be cancerous tissue but a tumor can also be benign and thereby not cancerous, however still having an abnormal perfusion pattern.

Hence, one or more of the tissue areas detected as having an abnormal perfusion pattern based on the at least first body kernel and/or the at least second body kernel, can be classified as cancerous tissue, glandular tissue, thyroid tissue, tumor tissue, inflammatory tissue, or ischemic tissue. In that regard said classification is preferably based on said at least one second body kernel being labelled.

However, just as well as abnormal perfusion pattern can be classified, normal perfusion pattern can cover several types of tissue, e.gg. muscular tissue, body fat, ligament tissue, organ tissue, and also arteries and vein. Hence, one or more of the tissue areas detected as having a normal perfusion pattern based on the at least first body kernel and/or the at least second body kernel, can be classified as muscular tissue, body fat, ligament tissue, organ tissue, vein, or artery. In that regard said classification is preferably based on said at least one first body kernel being labelled.

The presently disclosed body kernel approach can again be applied, but this time the body kernel becomes the filter imposed by a subjects body on a fluorescent imaging agent in normally or an abnormally perfused tissue area, and wherein labelled body kernels have been generated for abnormally perfused and classified tissue areas, or normally perfused and classified tissue areas, such that a database of labelled body kernels exists.

Hence, when an abnormal or normal perfusion pattern has been detected, for example by the presently disclosed approach, a plurality of labelled body kernels can be convolved with the known input signal to generate a plurality of expected output signals, which can be compared to the fluorescent output signal from the detected normally or abnormally perfused tissue area. This can be provided in real-time and/or with previously acquired images. Alternatively and/or supplementary a body kernel can be calculated from the detected normal or abnormal perfusion pattern by means of deconvolution as described herein. The calculated body kernel can then be compared with the labelled body kernels and thereby possibly classified. I.e. classification can be provided by comparing body kernels and/or by comparing measured signals with expected signals calculated from labelled body kernels.

An abnormally perfused tissue areas, which has been detected, can also be classified by comparing the fluorescent output signal from the abnormally perfused tissue area to previously acquired fluorescent output signals from classified abnormally perfused tissue areas, i.e. labelled fluorescent output data. But the drawback is that the fluorescent output signal depends on the input signal. The presently disclosed body kernel approach is independent of the input signal, i.e. even though labelled body kernels are based on different types of input signal, they can still be applied to and convolved with the present input signal and thereby provide a much more accurate labelled expected output signals to compare with the measured fluorescent output signal from the abnormally perfused tissue areas.

Once one or more tissue areas have been detected as normal or abnormal and also classified they can be marked accordingly, e.g. visually in the images, e.g. by means of augmented reality, preferably in real time, such that for example these areas are marked for the surgeon.

An abnormal perfusion pattern in for example tumours may be caused by an uncoordinated and increased growth in vessels. Due to the uncoordinated nature, the fluorescent molecules may stay longer in the tumor and can therefore have a slower washout than what is typical for normal tissue. This change in fluorescence dynamics can be detected by the presently disclosed approach.

An abnormal perfusion pattern in for example inflammatory tissue may be caused by dilated vessels in the inflammation which results in increased perfusion of the inflammatory tissue which may result in an increased inflow of blood. This change in fluorescence dynamics can be detected by the presently disclosed approach.

Application of Artificial Intelligence (AI)

The presently disclosed approach can be improved by utilization of artificial intelligence, e.g. machine learning, neural networks, etc., that have been trained to identify normal and/or abnormal perfusion patterns, possibly in case of abnormal perfusion patterns also trained to classify abnormal perfusion patterns, for example by means of the presently disclosed body kernel approach, where a database of labelled body kernels exists, and thereby possibly identity the cause of the abnormal perfusion pattern.

For example in the form of supervised learning of a neural network, wherein the network is trained using large amounts of labelled data, e.g. in the form of images or videos, and/or labelled body kernels as mentioned above. The data may be labelled by experts such as surgeons and doctors, who are capable of identifying abnormal tissue such as glandular tissue in the images and/or videos. The labelled data can then be stored in a database (a 'knowledge bank'), and later retrieved and compared to new measurements. The labelled data in the database can then be refined as more data from more operations is collected (from different patients). Once the 'knowledge bank' is of a sufficient size (with data from e.g. 500-1000 operations), the neural network is then configured to compare locally estimated body kernels from new operations with the 'true' body kernels saved in the database. Should an estimated body kernel correlate/match with a body kernel in the database, then the tissue area is preferably automatically flagged/auto-segmented, such that the surgeon can check the area out in more detail.

Distinguishing Arteries and Veins

One embodiment of the disclosed method comprises the step of distinguishing arteries and veins in the identified blood vessels. This distinguishing between arteries and veins is advantageously based on the predetermined pattern of the oscillating fluorescent signal, i.e. the input signal. The bolus hemodynamics is different for arteries and veins and when a bolus of e.g. ICG extends through a patient, the fluorescent signal will initially appear in the arteries, then in microcirculation in the surrounding tissue and after a while in the veins. Hence, time differences between bolus injection, artery signal, tissue signal, and vein signal can for example be determined from the first or the first few boluses by analysing a series of corresponding images and look for signals in that order. I.e. the presently used novel micro-bolus dose regime imposes a multitude of time and/or wavelength dynamics that can be utilized. Because only one, or a few, micro-bolus of fluorescent imaging agent is necessary to determine the patient specific/situation specific time difference between bolus injection and artery signal and between the artery signal and the vein signal, these time differences can be utilized in subsequent controlled micro-bolus administrations to continuously distinguish arteries and veins. The time differences between artery signal and tissue signal and between tissue signal and vein signal can also be utilized. In addition, the washout period of each micro-bolus involves different hemodynamics for arteries, veins and surrounding tissue, which can be utilized to identify blood vessels and distinguish between arteries and veins, even during a washout period between bolus injections.

Identifying Blood Vessels

One example of identifying blood vessels in fluorescence images is by means of image filtering, e.g. filtering based on time-varying image gradients, of the acquired fluorescent images. Due to the oscillating fluorescent signal and the hemodynamics in the tissue, there will periodically be regions in the acquired images where the image brightness changes significantly. These areas are most often either arteries or veins and hence by constantly applying appropriate image filtering, blood vessels will appear substantially constantly during the continuous bolus administration.

Another more accurate approach is to identify blood vessels based on an inherent phase difference between fluorescent signals associated with blood vessels and surrounding tissue, respectively. This is due to the hemodynamics in the body of the subject/patient. The overall oscillating fluorescent signal as disclosed herein is imposed by controlled and repeated injections of small boluses of a fluorescent agent like ICG. Each bolus of the fluorescent agent will also give rise to varying fluorescent signals on a more local level due to the hemodynamics in the subject. The fluorescent agent of each small bolus will reach arteries, tissue and veins at different time points and the presently disclosed approach utilizes these time differences to identify blood vessels, to distinguish blood vessels and tissue and to distinguish arteries, veins and tissue. The time differences between fluorescent signals originating from arteries, tissue and veins, respectively, can be seen as phase differences in a continuously evolving fluorescent signal. I.e. at any time during the oscillating fluorescent signal there are phase differences at different positions in the corresponding acquired fluorescent image resulting from the varying hemodynamics in arteries, veins and surrounding tissue, i.e. due to the inherent time differences originating from the hemodynamics of the subject. Either the subject specific time differences are known or the first one of few boluses can be used to determine the subject specific time differences, i.e. determining at least one time difference selected from the group of: time difference between bolus injection and artery fluorescent signal or vein fluorescent signal, time difference between artery fluorescent signal and vein fluorescent signal, and time difference between artery fluorescent signal or vein fluorescent signal and tissue fluorescent signal. Accordingly, any of the methods disclosed herein may further comprise the steps of analysing at least part of the fluorescence images/signal and determining at least one time difference selected from the group of:
- time difference between bolus injection and artery fluorescent signal or vein fluorescent signal or tissue fluorescent signal,
- time difference between artery fluorescent signal and vein fluorescent signal, and
- time difference between artery fluorescent signal or vein fluorescent signal and tissue fluorescent signal, and
- continuously identifying tissue and/or blood vessels in the fluorescence images based on said time difference(s) and the fluorescent output signal.

This can be provided once, for some of the bolus injections or for each of the bolus injections.

One or more of these time differences can be "converted" to corresponding phases/phase differences or one or more of blood vessels, arteries, veins, surrounding tissue and/or something else. Hence, knowing the expected phases of arteries, veins and surrounding tissue it is thereby possible to associate each pixel, or ROI in the fluorescent image with a classification of either artery, vein, surrounding tissue or something else.

The expected phases of arteries, veins and surrounding tissue at a given point in time can be directly related to the predetermined oscillating pattern, which determines the period and oscillation frequency of the oscillating fluorescent signal. The expected phases can either be approximated, calculated and/or determined during the medical procedure, e.g. as an initial learning period where the oscillating fluorescent signal is observed for one or a few micro-boluses to measure the associated hemodynamics in the specific situation. Thereby the expected phase of artery, vein and surrounding tissue can be directly related to the time point where a bolus is injected. Hence, in the subsequent medical procedure the time point of each bolus injection provides information of the expected phase of artery, vein and surrounding tissue.

Hence, the presently disclosed method may comprise the step of determining a phase difference between a fluorescent signal originating from arteries in the tissue and a fluorescent signal originating from veins in the tissue and optionally a fluorescent signal originating from the tissue surrounding the blood vessels and relating this phase difference to the predetermined oscillating pattern.

Analysing phases and/or phase differences in a sequence of fluorescence images is therefore one way to identify blood vessels in the fluorescent images. I.e. blood vessels can be identified/detected in a fluorescent image sequence on a pixel by pixel level by knowing the phase of the fluorescent signal—and this can be detected anytime during the micro-bolus dose regime. This phase information coupled with knowledge of the predetermined bolus administration, i.e. that the fluorescent signal is oscillating with a predetermined pattern, provides the necessary information whether a pixel, or a region of interest (ROI), in an image is a blood vessel or not and even whether a pixel, or a region of interest, in an image is an artery, a vein, tissue or something else. Thereby actual mapping of the blood vessels, including arteries and veins, in substantially each fluorescent image can be provided, e.g. a pixel-by-pixel, or groups of pixels, or ROI-by-ROI, mapping in the form of each pixel—or ROI—being classified as blood vessel (preferably including artery or vein), surrounding tissue or optionally otherwise.

The presently disclosed approach can provide medical personnel with a constantly updated map of the blood vessels, including arteries and veins, in the surgeon's field of view/anatomical region of interest. In particular, the identified arteries and veins can be superimposed into white light images, visually enhanced such that arteries and veins are visually distinguishable, e.g. each having a separate high contrast colour, and displayed on a screen.

Once identified, and possibly mapped, in a fluorescent image, or sequences thereof, the blood vessels, preferably including identified arteries and veins, can be tracked in subsequent fluorescent images even in movement, such as peristaltic movement, is involved. Tracking of identified blood vessels and/or tissue areas with normal perfusion pattern and/or tissue areas with abnormal perfusion pattern, can for example be provided by using tracking methods available in the prior art and known to the skilled person. Examples of tracking in fluorescent images are disclosed in WO 2018/104552.

System

As previously described, the present disclosure further relates to a system configured to carry out any of the methods disclosed herein.

In one embodiment, the system further comprises a controllable injection pump for holding at least one first fluorescence imaging agent, the injection pump being configured for injecting a series of predefined boluses of said first fluorescence imaging agent into a vein of the subject, thereby generating the input signal.

The fluorescence images may be received by an appropriate imaging unit, such as a camera, e.g. a surgical, laparoscopic or microscope camera, such as a video camera, which can be part of the presently disclosed system. The analysis may be provided by a processing unit, either locally or as part of a cloud service. The presently disclosed system may be configured to carry out all the steps of the presently disclosed method.

The predefined bolus preferably corresponds to less than 0.01 mg ICG/kg body weight of the first fluorescence imaging agent, more preferably less than 0.005 mg ICG/kg body weight of the first fluorescence imaging agent. A predefined bolus may also correspond to less than 0.5 mg ICG of the first fluorescence imaging agent. Preferably the fluorescence agent is ICG and the amount of ICG in a predefined bolus is preferably less than 0.01 mg/kg body weight of the subject, most preferably less than 0.005 mg/kg body weight of the subject. Hence, preferably the amount of ICG in a predefined bolus is less than 1 mg ICG or less than 0.5 mg ICG, most preferably less than 0.25 mg ICG.

The system may be configured to inject boluses with an interval between 5 and 600 seconds, such as between 15 and 300 seconds, for example between 45 and 210 seconds, such as between 90 and 120 seconds.

A further advantage of the presently disclosed approach is the opportunity to identify a local network of blood vessels. By clamping a freely visible blood vessel for a short period, the associated perfusion area is delimited and by subsequently observing the fluctuating ICG signal, the associated network becomes clearly visible because the perfusion in that area rapidly changes.

Gastrointestinal Tract

Complications related to the gastrointestinal tract are often related to local hemodynamics. Thus, a change in the normal hemodynamic conditions may be an indicator of increased risk of a complication. Perfusion assessment of the gastrointestinal tract, in particular in and near the surface of the gastrointestinal tract, such as the tissue of the gastrointestinal wall, can therefore be an important diagnostic tool when examining the gastrointestinal tract, e.g. for diagnosis or for localization of a complication, for example during diagnostic laparoscopy, explorative laparoscopy or surgical laparoscopy with traditional laparoscopy or robotic surgery, as well as in open surgery. Perfusion assessment is also important during the surgical procedure of creating an anastomosis which can be provided to establish communication between two formerly distant portions of the gastrointestinal tract. As an example intestinal anastomosis establishes communication between two formerly distant portions of the intestine and typically restores intestinal continuity after removal of a pathologic condition affecting the bowel. Intestinal anastomosis may for example be provided for 1) restoration of intestinal, such as bowel, continuity following resection of diseased intestine, and 2) bypass of unresectable diseased intestine, e.g. bowel. Certain paediatric conditions may also require intestinal anastomosis.

Resection of diseased bowel can be performed in the following settings:

Bowel gangrene due to vascular compromise caused by mesenteric vascular disease, prolonged intestinal obstruction, intussusceptions, or volvulus Malignancy Benign conditions (e.g. intestinal polyps, intussusception, roundworm infestation with intestinal obstruction)

Infections (e.g. tuberculosis complicated with stricture or perforation)

Traumatic perforations

Large perforations (traumatic) not amenable to primary closure

Radiation enteritis complicated with bleeding, stricture, or perforation

Inflammatory bowel disease, ulcerative colitis, or Crohn's disease that is refractory to medical therapy or associated with complications (e.g. bleeding, perforation, toxic megacolon, dysplasia/carcinoma)

Chronic constipation, idiopathic slow transit constipation, or Hirschsprung's disease: Subtotal colectomy may be performed when the disease is refractory to medical therapy.

Bypass of unresectable diseased bowel can be performed in the following settings:

Locally advanced tumour causing luminal obstruction

Metastatic disease causing intestinal obstruction

Poor general condition or condition that prevents major resection

Paediatric conditions for which intestinal anastomosis may be required include the following:

Congenital anomalies (e.g. Meckel diverticulum, intestinal atresia, malrotation with volvulus leading to gangrene, meconium ileus, duplication cysts, Hirschsprung's disease)

Inflammatory conditions (e.g. necrotizing enteritis, enterocolitis, tuberculosis, enteric perforation)

Other conditions (e.g. intussusception, angiodysplasia, polypoid disease, ascariasis)

As a part of other surgical procedures (e.g. Kasai portoenterostomy, choledochal cyst, urinary diversions, pancreatic neoplasms)

Postsurgical complications in connection with anastomosis in the gastrointestinal tract are unfortunately frequent, often due to insufficient perfusion (capillary blood supply) at the anastomosis, i.e. the joining of the two parts of the tract. Insufficient perfusion, i.e.

an example of abnormal perfusion, may cause anastomotic leakage, which is a serious and frequent complication, for example in connection with colorectal surgery where more than 10% of the procedures result in complications. Within colon cancer surgery more than 30% of patients with anastomotic leakage die due to postoperative complications and approx. 25% of the remaining patients suffer from stoma for the rest of their lives. Risk factors associated with leakage include tension of anastomosis, tissue damage and in particular reduced blood perfusion.

The present disclosure further relates to performing image analysis of one or more video sequences representing at least a part of the gastrointestinal tract, wherein fluorescence images of the tissue are continuously acquired as described herein, for example acquired before, during and/or after surgery, in particular surgery involving the gastrointestinal tract. This may apply to gastrointestinal surgery—the video sequence may therefore comprise at an exterior portion of at least a part of the gastrointestinal tract, preferably such that perfusion in at least a part of the gastrointestinal wall can be measured and assessed.

The gastrointestinal tract is an organ system within humans and other animals which takes in food, digests it to extract and absorb energy and nutrients, and expels the remaining waste as faeces and urine. The gastrointestinal tract can be seen as a tube that transfers food to the organs of digestion. The term gastrointestinal tract as used herein therefore includes the buccal cavity; pharynx; the small intestine including duodenum, jejunum, and ileum; the stomach, including esophagus, cardia, and pylorus; the large intestine including cecum, colon, rectum and the anal canal.

Clinical Applications

Visualization of blood vessel anatomy and detection and classification of an abnormal perfusion pattern as disclosed herein is of great importance during almost any kind of surgery as the continuous detection of blood vessels will reduce the risk of unintended cutting a blood vessel, whereas detection and optional classification of abnormally perfused tissue may help in identifying malignant, cancerous, and/or inflammatory tissue areas. The presently disclosed system and method can in particular also be employed within the following clinical applications:

Abdominal/General Surgery

Resection surgery, to quickly locate correct blood vessels to be cut/ligated and detect tissue areas with reduce perfusion Ischemic bowel surgery, to quickly determine which and where blood vessels are blocked and anatomy insufficiently perfused.

Acute abdomen, to help discover the underlying pathology, e.g. rule out ischemia.

Repeated surgery, surgery in previously operated patients having a lot of surgical adhesions.

Cancer surgery performed by general surgeons, in order to detect blood vessel and abnormal perfusion patterns, like in resection surgery.

General surgery, involving substantially any organ in the abdominal tract. e.g. when performing anastomosis or surgery on the stomach (ventricle).

General surgery, involving infections, superficial or deep, to detect and map blood vessels and/or detect, classify and/or map abnormally perfused tissue areas.

Thyroid Surgery

Thyroid surgery, including resection of thyroid tissue. Continuous detection of blood vessels and abnormal perfusion patterns is a major advantage as thyroid surgery carries a risk of excessive bleeding. Thyroid surgery also carries a risk of dissecting or removing part of one or more of the parathyroid glands and the presently disclosed approach can be applied for identifying and mapping blood vessels in the relevant area such that the parathyroid glands are more visible to the surgeon. In one embodiment, the images are acquired during thyroid surgery, wherein blood vessels and/or abnormally perfused tissue areas in one or more of the parathyroid glands are identified and visualized to medical personnel involved in the surgery.

Pelvic Surgery

Gynecologic/urogynecologic surgery, in order to quickly locate correct blood vessels to be cut/ligated, and to identify and distinguish blood vessels during surgery.

Cancer surgery, in order to detect blood vessel and/or detect and advantageously classify abnormally perfused tissue areas.

Kidney Surgery

Cancer surgery, in order to detect blood vessel and/or detect and advantageously classify abnormally perfused tissue areas.

Plastic Surgery

Skin transplantation, in order to quickly locate abnormally perfused tissue areas and/or correct blood vessels in donor to be cut/ligated, and to monitor the perfusion of the same blood vessels on the recipient; both in the acute setting during surgery, but also in the days that follow, in order to monitor healing and blood vessel formation.

In all skin near surgical procedures, in order to detect and map abnormally perfused tissue areas and/or detect and map the blood vessel structure in an anatomical region before the surgical procedure is initiated, and during the surgical procedure if the surgeon deems this necessary for additional information. I.e. the presently disclosed approach can be used as a clinical tool to identify and map a patient's blood vessels and the associated blood vessel anatomy days or weeks before a surgical procedure is to be carried out, giving the medical personnel time to plan the procedure carefully. This mapping can be carried out according to the presently disclosed approach, that measures the fluorescent signal through the skin in the area of interest for e.g. 30-45 minutes, and creates a 2D or 3D map for the medical personnel to use in the planning. A map of identified blood vessels can be integrated with other examinations, such as CT-, MR- or ultrasound scans. The presently disclosed approach has the advantage that it allows for identification and mapping of blood vessels which are too small to be mapped precisely in e.g. a CT-scan.

Ear, Throat and Neck Surgery

A variety of procedures including: Facial cosmetic surgery, tracheostomy, cancers, etc.

Orthopedic Surgery

Amputations, in order to quickly detect and map abnormally perfused tissue areas and/or identify and map blood vessels before a limp or anatomical region is amputated, to choose the correct site of amputation and the best site to close the skin again to secure optimal healing.

Infections etc., in order to detect and map abnormally perfused tissue areas and/or detect and map blood vessels where debridement or similar procedures are necessary.

Cardiac Surgery

CABG, in order to quickly detect and map abnormally perfused tissue areas and/or identify and locate marginal blood vessels to the heart when performing bypass surgery.

Vascular Surgery

Amputation surgery, in order to quickly detect and map abnormally perfused tissue areas and/or identify and locate correct blood vessels to be cut/ligated as above, Harvesting of blood vessels for bypass surgery, in order to detect and map abnormally perfused tissue areas and/or quickly identify and locate correct blood vessels to be cut/ligated.

EXAMPLES

Figure 1B:
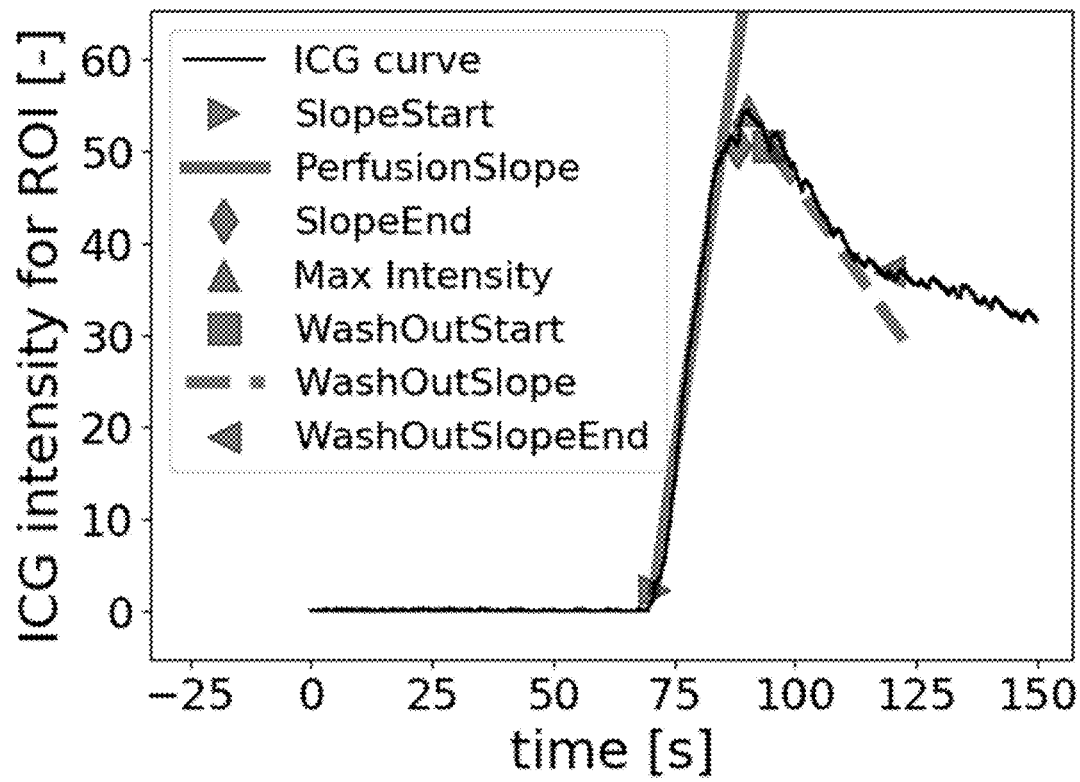

The intensity curves shown in FIGS. 1A-B are results of injections of boluses with normal amounts of fluorescent agent, in these cases ICG. In the amount of ICG in each bolus was chosen such that fluorescence emission was visible to the human eye. The examples are provided to illustrate the various perfusion parameters that can be calculated following fluorescent imaging. These same parameters can to a large extent also be determined following injection of the much smaller doses, i.e. the micro-dose approach with possibly repeated and continuous measurements and related assessment of perfusion and identification of blood vessels, which is disclosed herein.

FIG. 1A show an example of an intensity curve acquired from tissue after a bolus of ICG has been provided to a subject, e.g. from a region of interest in a video sequence. The same kind of data could be obtained if another contrast agent was used. The intensity is substantially zero until a steep rise in intensity indicates the passage of ICG molecules in the imaged tissue, the ICG molecules being excited to fluoresce. The peak in intensity is followed by the gradual washout of the ICG molecules. The intensity is indicated with arbitrary units.

FIG. 1B shows the corresponding intensity curve where the hemodynamic parameters perfusion slope, slope start, slope end max intensity, washout slope, washout start and washout slope end have been calculated and are indicated in the graphs. Assessment of perfusion parameters are further disclosed in pending application WO 2018/104552 which is hereby incorporated by reference in its entirety.

Figure 2A:
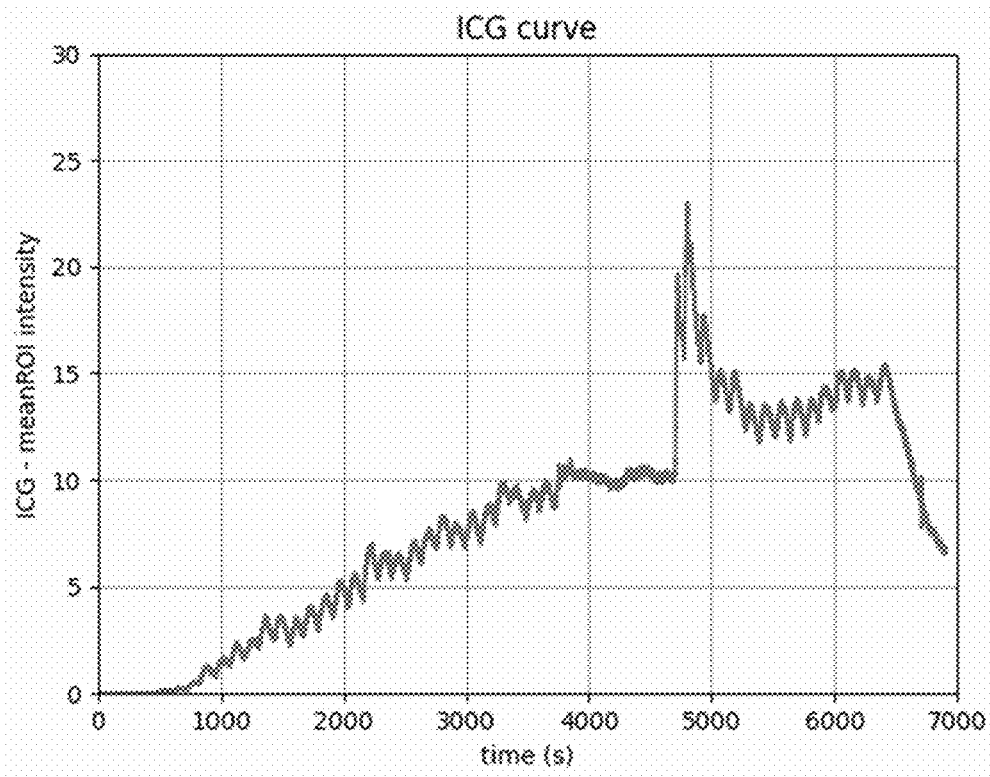
FIG. 2A shows an oscillating time intensity fluorescent curve wherein the oscillations are disrupted due to the onset of ischemia in a human subject.
Figure 2B:
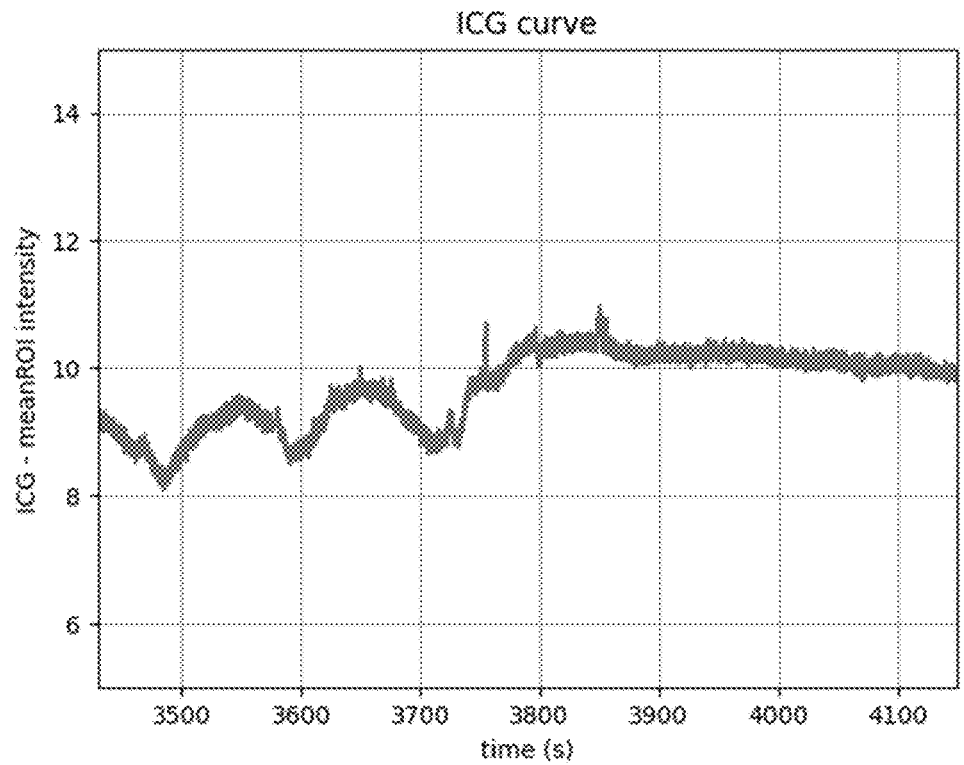
FIG. 2B shows a zoom-in of the time interval around t=3800 s of the previous graph wherein the onset of ischemia occurs.
Figure 2C:
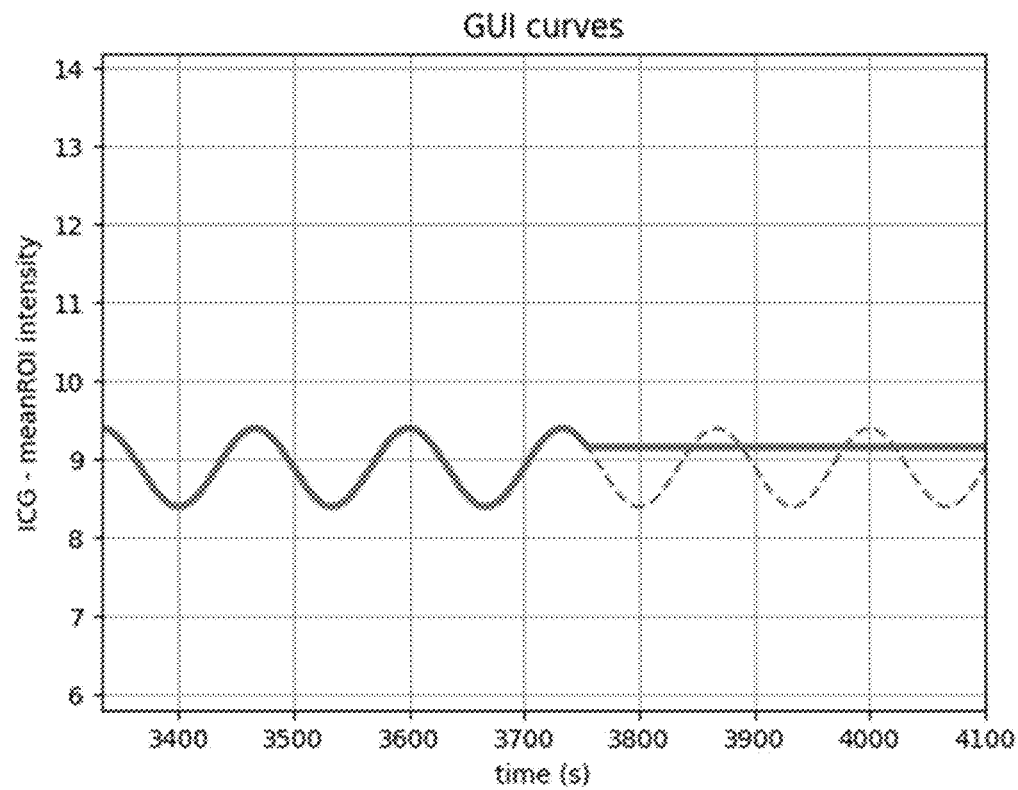
FIG. 2C shows idealized data with and without ischemic conditions.
Figure 2D:
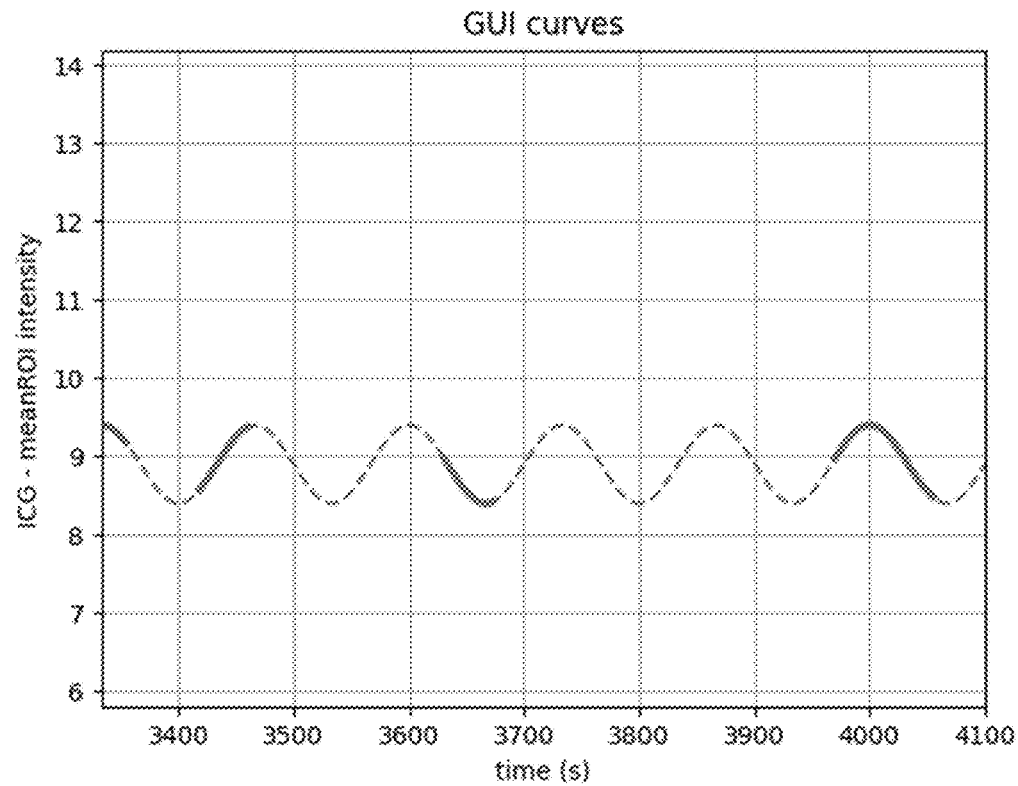
FIG. 2D shows idealized data wherein only parts of the oscillating time intensity fluorescence curve may be detected.

FIG. 2A shows actual measurement data from a human subject. The human subject is repeatably injected with micro boluses of ICG at regular intervals (in this example with intervals of around 2 minutes). The initial micro bolus of ICG comprised an amount of 0.00456 mg ICG/kg body weight of the human subject and each of the subsequent micro boluses of ICG comprised the same amount of 0.00456 mg ICG/kg body weight of the human subject. The time intensity curve shows a substantially sinusoidal pattern which increases linearly over time. The increase in intensity over time is related to the proportion between the dose of the fluorescent agent and the wash out time, during which the fluorescent intensity decreases. At a certain time point, around t=3800 s, FIG. 2B, the perfusion is restricted causing an onset of ischemia, which can be seen by the lack of oscillations following this time point, forming what can be described as an ischemic flatline.

FIG. 2C shows idealized data displaying a sinusoidal time-intensity curve. The measured ROI intensity increases upon injection of a fluorescence imaging agent and decreases during the wash-out phase. At approximately t=3750 s the measured data shows a stationary measured ROI intensity value due to the onset of ischemic conditions. Alternatively, had there not been ischemic conditions, the measured values are instead expected to follow the dashed line, such that the measured ROI values continuously follows the sinusoidal pattern.

FIG. 2D shows idealized data displaying a sinusoidal time-intensity curve without ischemic conditions wherein the anatomical region of interest drifts in and out of focus. The dashed line shows the expected measurement values if the ROI would be continuously observable. If this is not possible, for example due to the anatomical region of interest drifting in an out of focus of the recorded image, the measured data may not be complete but instead gaps—time intervals wherein no measurement data of the anatomical region of interest have been acquired—may be present. Therefore, the system is preferably able to recognize the sinusoidal pattern even when the recorded data is not complete because the phase of dynamics is known, for example because the expected fluorescent output can be determined if a relevant body kernel has been obtained. If the system is able to correctly recognize the sinusoidal pattern, it is provided with expected intensity values of the ROI at each time point, which thereafter can be used for comparison with measured values. If the measured value(s) differs from the anticipated value(s) the system may be configured to provide the surgeon with an alarm. Therefore, the system may be configured such that it recognizes the phase of the oscillating/sinusoidal pattern of a measured time point or interval, which is thereafter compared to an expected phase of the time point or interval, wherein the expected phase is preferably based on the recognized oscillating pattern and/or the known frequency of the repeated bolus injections. As a result, the system does not necessarily require continuous measurement values, but may instead be based on the expected phase of the oscillating pattern in combination with the time information of the measured time point or interval, such that a specific phase of the oscillating pattern is expected to be present in the measured interval.

Figure 3A:
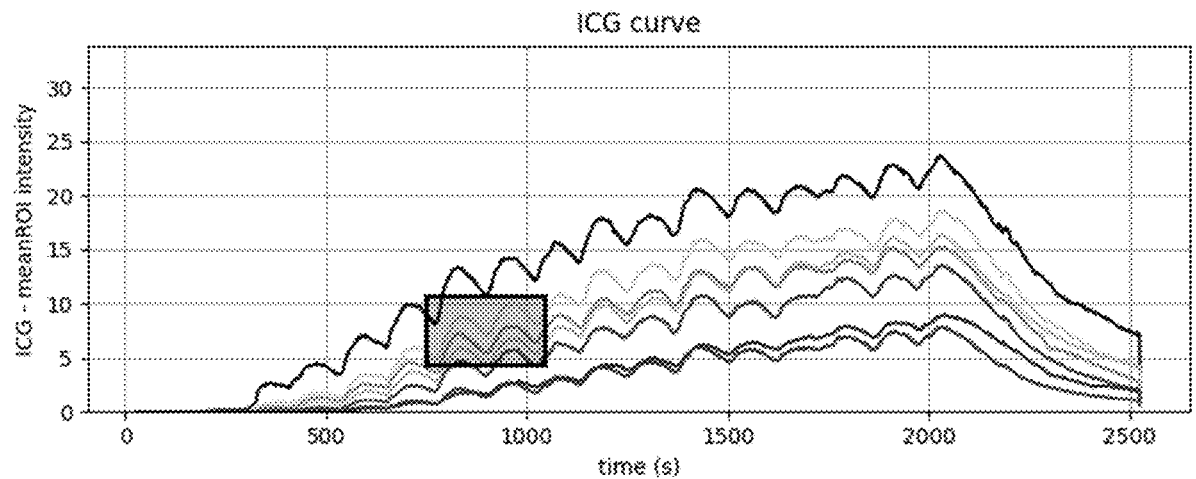
FIG. 3A shows continuous measurements of a human subject injected with micro boluses.

FIG. 3A shows a fluorescent intensity measurement of a human subject conducted over a longer time interval, approximately 40 minutes, wherein the human subject has been repeatedly injected with micro boluses of ICG. The initial micro bolus of ICG comprised an amount of 0.0046 mg ICG/kg body weight of the human subject and each of the subsequent micro boluses of ICG comprised the same amount of 0.0046 mg ICG/kg body weight of the human subject. The intensities of seven separate ROIs were measured, and have been assigned separate colours in the graph. The measured fluorescence intensities show cyclic sinusoidal patterns wherein the frequencies agree with the injection frequency (around 120 s). The patterns are substantially linearly increasing due to the accumulation of the fluorescence imaging agent, due to the relatively short period of the injections in comparison to the dose size. At approximately t=2000 s, the repeated injections of the fluorescence imaging agent are stopped causing an approximately exponential decay of the fluorescence intensity.

Figure 3B:
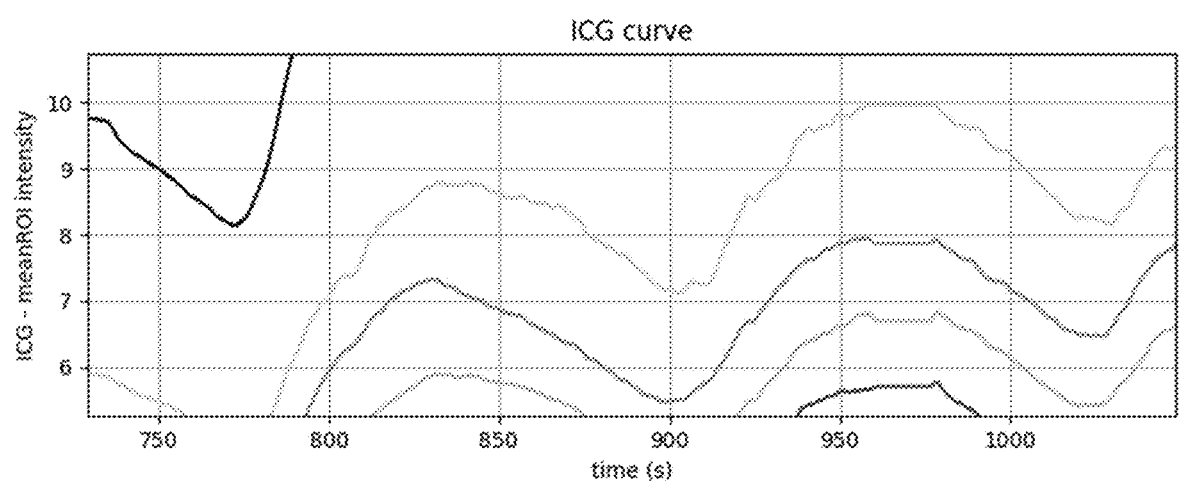
FIG. 3B shows a zoom-in of the interval indicated in FIG. 3A.

FIG. 3B shows a zoom-in of the marked region in FIG. 3A. Here, the smaller fluctuations within the same ROI as well as between different ROIs can be seen. At the same time, the cyclic intensity patterns are distinct with the pattern of each ROI have an identical period.

FIG. 4 shows time-intensity plots of a measurement carried out on a human subject by repeatable injections of micro boluses of the fluorescence imaging agent. The initial micro bolus of ICG comprised an amount of 0.00456 mg ICG/kg body weight of the human subject and each of the subsequent micro boluses of ICG comprised the same amount of 0.00456 mg ICG/kg body weight of the human subject. The graph shows the result of a venous occlusion wherein, between approximately t=62-78 minutes, the perfusion is restricted, while not completely hindered. In this case, the oscillating dynamics of the measured fluorescence intensities ceases and the measurements display an irregular increase during the venous occlusion. Therefore, it should be noted that decreased perfusion does not necessarily result in a flatline, as is otherwise typically the result during ischemic conditions.

Figure 5A:
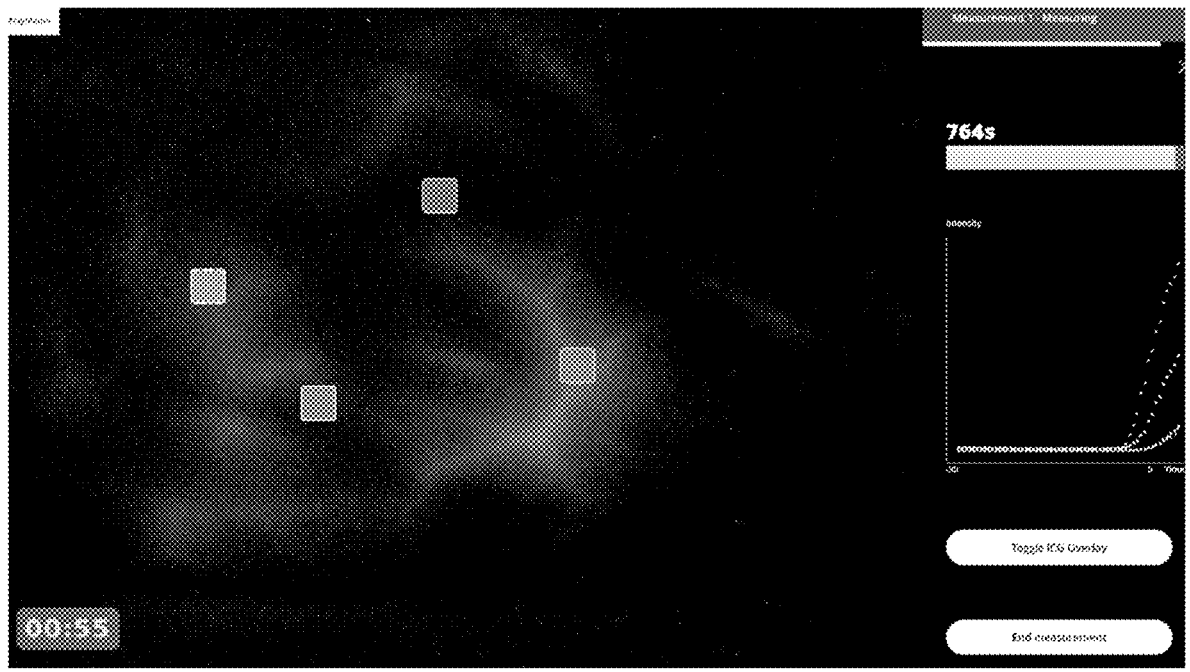
FIG. 5A shows a snapshot of an ICG analysis tool running on a humanoid subject (right forearm). The image is taken at a very early stage, where a micro-bolus of ICG has just been administered and is beginning to enter the arteries.

FIG. 5A shows a snapshot of an ICG analysis tool running on a humanoid subject. The images acquired in FIGS. 5-10 shows a section of the right forearm, i.e. the fluorescence signal is seen through the skin on the arm. The image in FIG. 5A is taken at a very early stage of a bolus injection, where a micro-bolus of ICG has just been administered and is beginning to enter the arteries, i.e. some arteries can be identified. Four boxes in the image indicate measuring regions, aka regions of interest (ROI), and four ICG intensity curves are shown on the right, one for each ROI. One of the ROIs is located on and artery and the corresponding intensity curve is the highest. One ROI is located on a tissue area and the associated intensity curve shows that some ICG has already diffused in to the tissue. Two ROIs are located on veins and are almost flat indicating that ICG is yet to exit the tissue area to be transported back through the veins. The intensity curves of the two vein ROIs are coincident and cannot be distinguished from each other. The phase differences of the four ICG intensity curves are clearly visible. Hence, if the expected phase of arteries, veins and tissue were known, the four ROIs in FIG. 5A could be classified as artery, vein, and surrounding tissue, respectively.

Figure 5B:
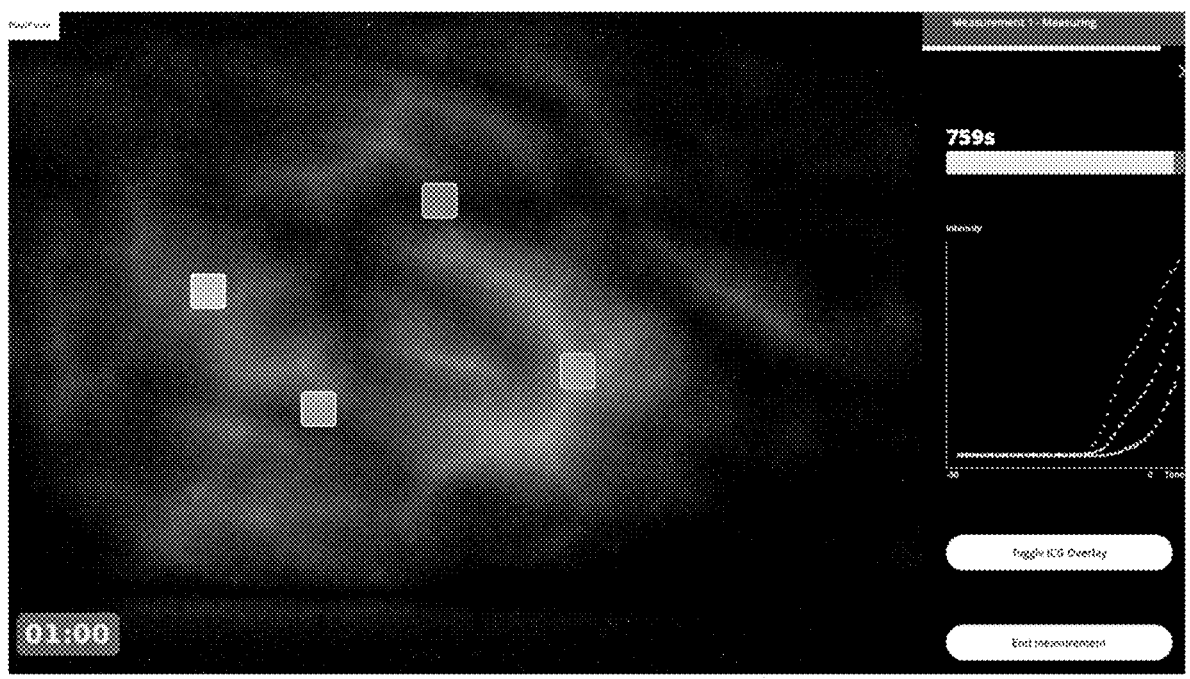
FIG. 5B shows a snapshot a few seconds later than FIG. 5A where a plurality of arteries can be identified.

FIG. 5B shows a snapshot a few seconds later than FIG. 5A where a plurality of arteries can be identified visually. Still there are several dark areas where the ICG has yet to spread, i.e. ICG is still entering the subject. All four ICG intensity curves of the four ROIs are steadily increasing. However, as seen from the curves there are distinct phase differences for the three groups of curves: 1) arteries, 2) tissue, and 3) veins). The artery ROI is ahead of the two other groups. The tissue ROI is 'behind' the artery curve. And the tissue ROI is "ahead" of the vein ROIs. Notice, that the phase differences in both directions are more or less equal, i.e. the tissue is approx. midway on the ICG molecules journey from arteries to tissue to veins. Again the ROIs can be classified as either artery, vein, surrounding tissue or other if the expected phase is known. This can be provided for all pixels in the image, or groups of pixels, i.e. all pixels can be classified as artery, vein, surrounding tissue, or other, if the expected phase is known. I.e. image filtering can provide a visual identification of blood vessels, but if the phase of the various signals is known relative to the predetermined oscillating pattern, all or most of the pixels in the images can be classified, i.e. much more detailed information is obtained. This can for example be utilized when superimposing the blood vessels into white light images and also when it is needed to track objects in a sequence of images where movement, e.g. peristaltic movement, takes place.

Figure 6A:
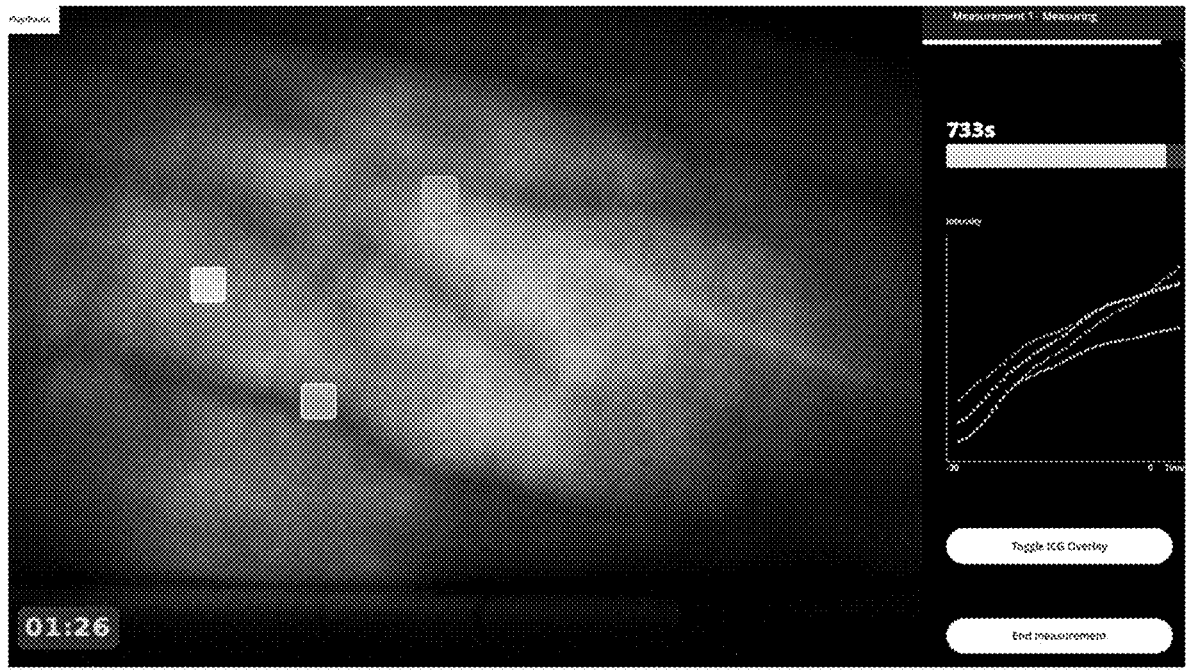
FIG. 6A shows a snapshot a few seconds later than FIG. 5B where the fluorescence intensity from the specific micro-bolus ICG is reaching its peak value.

FIG. 6A shows a snapshot a few seconds later than FIG. 5B where the fluorescence intensity from the specific micro-bolus ICG is reaching its peak value. After this point, more ICG will start to leave the tissue area than the amount of ICG which enters it. Comparing the image to earlier shown snapshots in FIGS. 5A-B it is seen that almost all areas are now visible. The darkest areas are now the veins, which have yet to start transporting the ICG away from the tissue. This is also reflected in the corresponding ICG intensity curves to the right. The ICG curves are all still increasing, i.e. we are still in the artery-dominated phase, but the concave shape of the curves indicated the peak intensity is approaching. But a phase difference is still seen between the ICG intensity curves. In this snapshot the blood vessels are not clearly identifiable because too much ICG has entered the tissue area from the arteries and not enough ICG has entered the veins yet. However, the veins can actually be identified as dark areas.

Figure 6B:
FIG. 6B shows a snapshot approx. one minute later than FIG. 6A and illustrates the washout phase wherein veins can be identified.

FIG. 6B shows a snapshot approx. one minute later than FIG. 6A and illustrates the washout phase wherein veins can be clearly identified. The corresponding perfusion analysis from the associated ICG curves shows that the vein ROIs clearly have the highest intensity but also that the time scale is different in the washout phase, i.e. it may require a longer timescale to assess the phase differences between arteries, tissue and veins in the washout phase. But phase differences are visible in the ICG curves.

Figure 7:
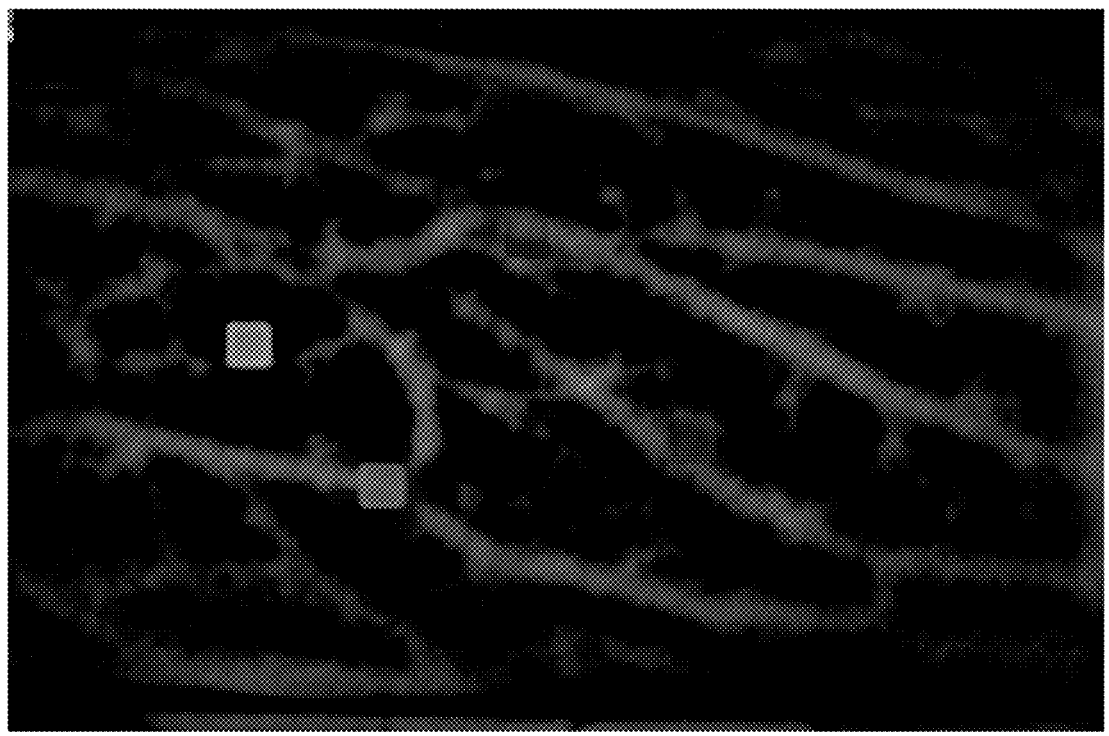
FIG. 7 shows an edge-filtered version of FIG. 6B.

FIG. 7 shows an edge-filtered version of FIG. 6B illustrating an example of a visual enhancements which can be provided for medical personnel during a medical procedure by exploiting the presently disclosed approach. Once the phase differences are known for the specific situation it is known when to optimally identify arteries and veins, respectively. In FIG. 7 the veins are visually enhanced which would allow the surgeon to avoid accidentally cutting any veins. A pixel-by-pixel approach is used in FIG. 7 in combination with edge-filtering to FIG. 6B followed by a smoothing filter. The result clearly darkens the entire image except for the main veins. This information could be overlayed/superimposed on any screen, also a white light image screen, visual to the surgeon during surgery to improve the foundation on which the surgeons draws his decisions.

Figure 8:
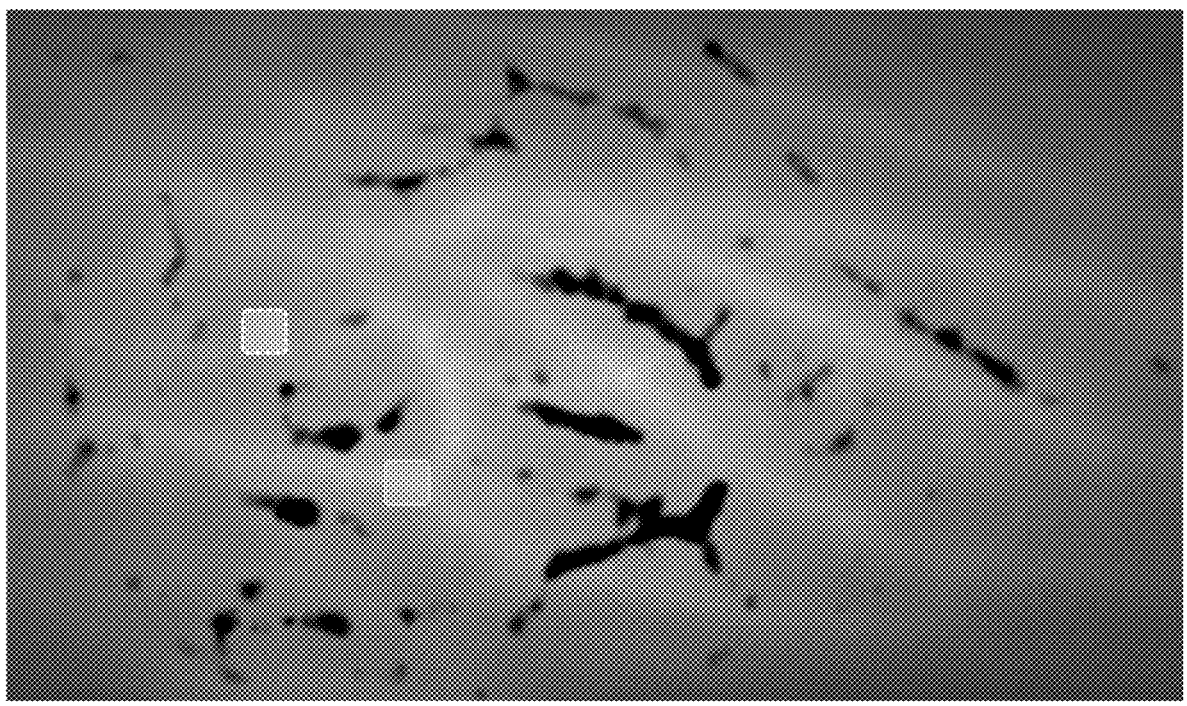
FIG. 8 shows an image where arteries have been identified in the sequence of images shown in FIGS. 5A-6B.

FIG. 8 shows an image where arteries have been identified in the sequence of images shown in FIGS. 5A-6B. The arteries are visually enhanced in black such that they are visible in a grey-scale image.

Figure 9:
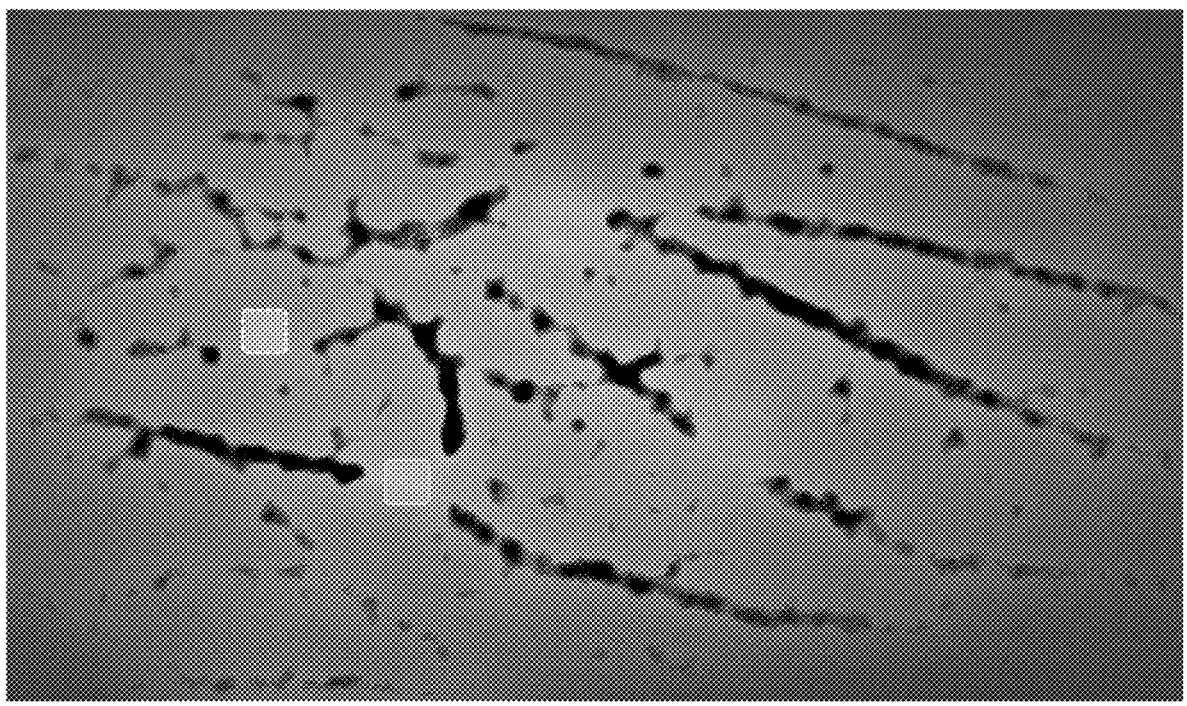
FIG. 9 shows an image where veins have been identified in the sequence of images shown in FIGS. 5A-6B.

FIG. 9 shows an image where veins have been identified in the sequence of images shown in FIGS. 5A-6B. The veins are visually enhanced in black such that they are visible in a grey-scale image.

Figure 10:
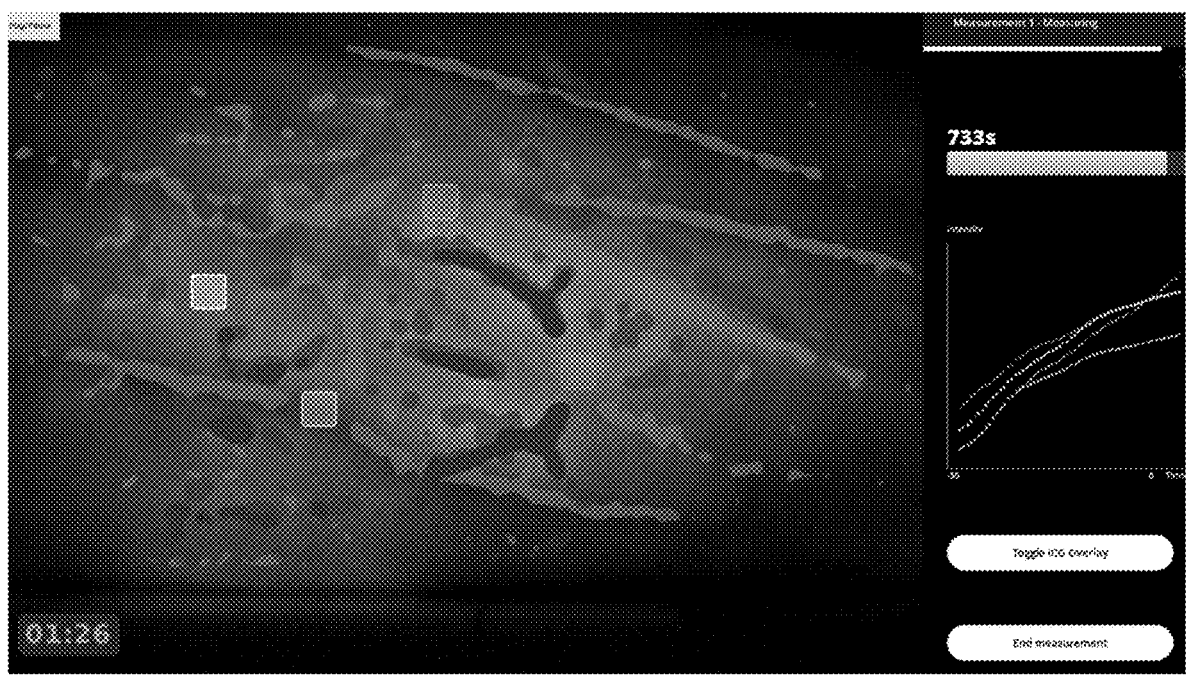
FIG. 10 shows an image where the arteries and veins shown in FIGS. 8-9 are visually enhanced in red (arteries) and blue (veins) and superimposed in the image such that they are easily distinguishable.

FIG. 10 shows an image where the arteries and veins shown in FIGS. 8-9 are visually enhanced in red (arteries) and blue (veins) and superimposed in an image such that arteries and veins are clearly visible and easily distinguishable. This is an example of an Augmented Reality (AR) view which can be offered to the surgeon during a medical procedure employing the presently disclosed approach. The red pixels have been mapped to the artery-group and the blue pixels have been mapped to the veins-group. These mappings can be continuously updated because the micro-bolus regime can run in the background. In practice a given group, such as the artery-group, has a known phase which can be identified at an initial learning period of the micro-bolus regime where the artery phase can be associated with the time point of each bolus injection. Once the artery phase is known a segment, e.g. a few seconds, of the fluorescent signal is sufficient to assess relevant perfusion curves for one or more pixels or ROIs in a sequence of images and compute a phase matching score. If the phase in the pixels/ROIs matches with the artery phase, the phase matching score will be high, and the pixels can consequently be identified as arteries and in this case colored with red. Similar calculations can be performed for the veins. Such phase matching assessments can be provided both during inflow of ICG and during the washout period. The presently disclosed approach of continuously identifying blood vessels in tissue can therefore run in the background continuously.

Figure 11:
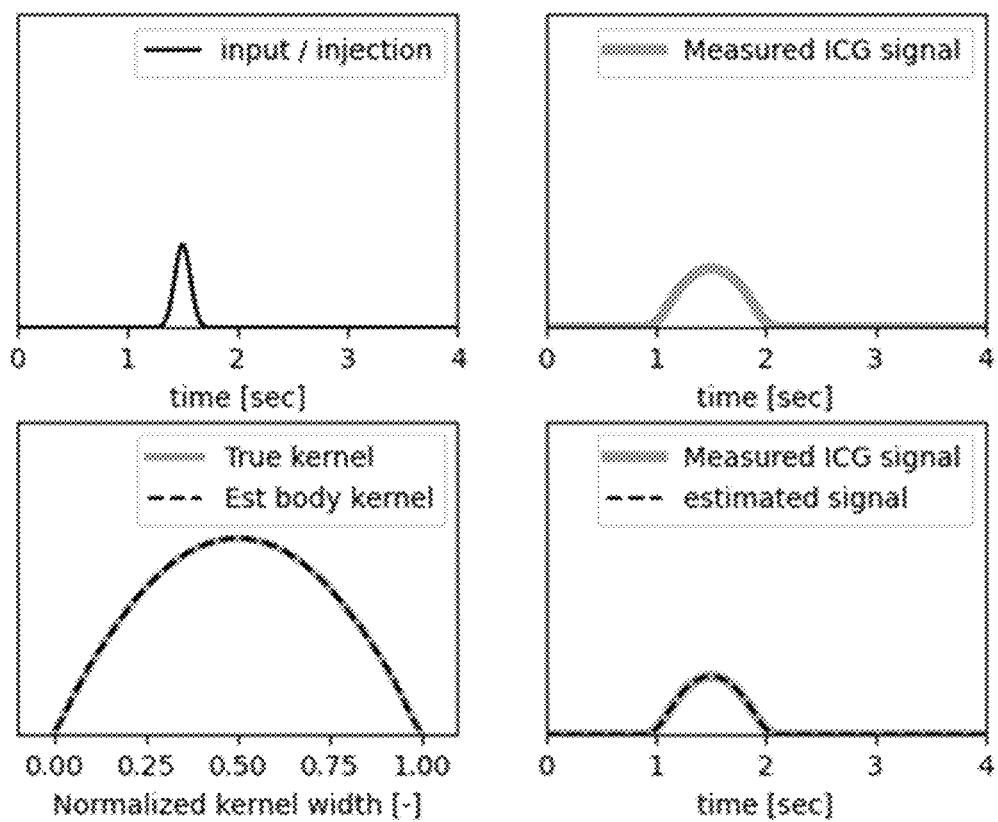
FIG. 11 shows four plots, which serve to illustrate how a body kernel can be estimated from a measured ICG signal and how said body kernel can be used to estimate the measured signal. In this example, synthetic data has been used.

FIG. 11 shows four plots, which serve to illustrate how a body kernel can be estimated from a measured ICG signal (aka fluorescent output signal) and how said body kernel can be used to calculated an expected output signal, i.e. the estimated signal. The top left plot shows a graph of the input signal (ICG volume versus time) of a single bolus injection of ICG. The top right plot shows the fluorescent output signal ('Measured ICG signal'). The bottom left plot shows the estimated body kernel and the true body kernel, and the bottom right plot shows the fluorescent output signal ('Measured ICG signal') along with the expected output signal ('estimated signal"). In this example, synthetic data (i.e. generated on a computer) has been used, since the figure is for explanatory purposes only. I.e. when the calculated body kernel shown in the bottom left figure is convolved with the input signal shown in the upper left graph, the result is the signal expected signal shown in the bottom right. For this idealized situation the expected and measured signals shown in the graph in the bottom right are completely coinciding. The same goes for the "True" and "Estimated" body kernels in the bottom left. The principle applies to real life data as well, as explained in relation to other figures.

Figure 12:
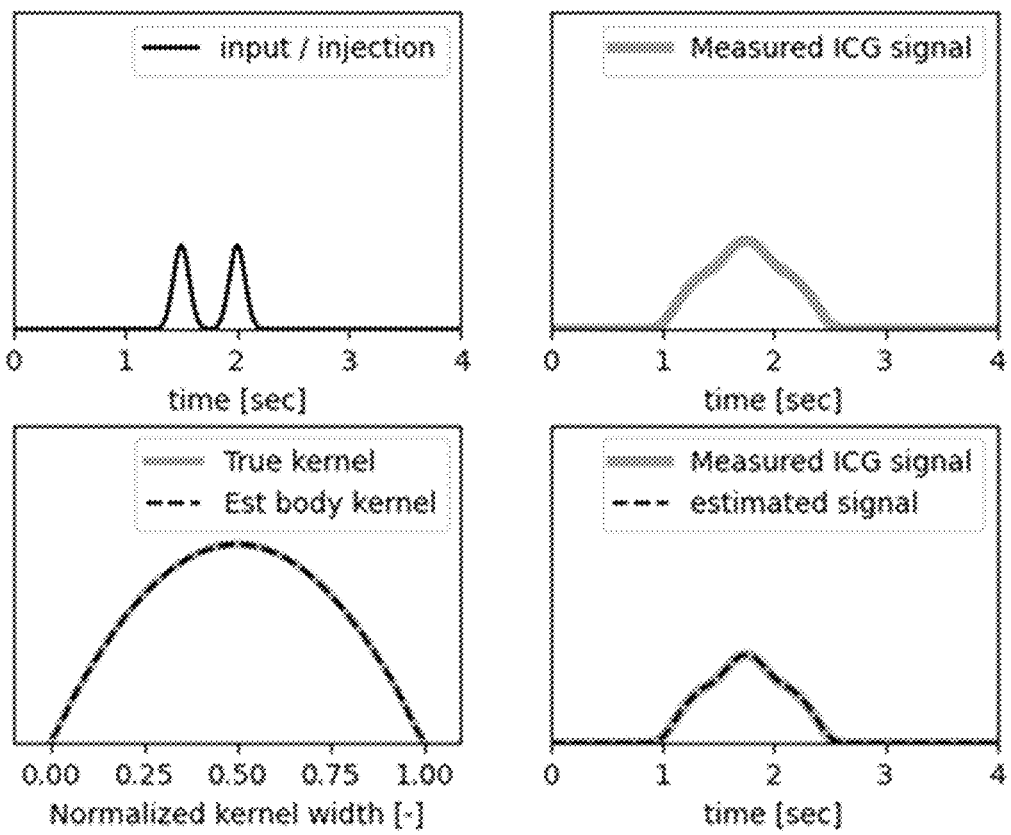
FIG. 12 shows essentially the same visual explanation as FIG. 11 via four plots. However, here, the input signal comprises two pulses, which alters the measured signal compared to the measured signal of FIG. 11.

FIG. 12 shows essentially the same visual explanation as FIG. 11 via four plots. However, here, the input signal comprises two pulses, i.e. two boluses, which alters the measured signal compared to the measured signal of FIG. 11. The body kernel stays the same as in FIG. 11, since it is a property of the human body, i.e. a measure of how the investigated tissue filters or changes the input signal, whereby the measured output signal is somewhat distorted/changed from the input signal. Similar to the data used in relation to FIG. 11, the data of FIG. 12 is synthetically created data to illustrate the basic principle of estimating body kernels to predict the expected measured signal. But the point is that the body kernel is the same in FIGS. 11 and 12, but without knowledge of the body kernel it would be substantially impossible to predict what kind of output signal, the double bolus input signal shown FIG. 12, would result in. But with knowledge of the body kernel, the double bolus input signal shown in upper left of FIG. 12 can be convolved with the body kernel and thereby calculate an expected output signal, that is seen to match the measured output signal in the bottom right of FIG. 12.

Figure 13:
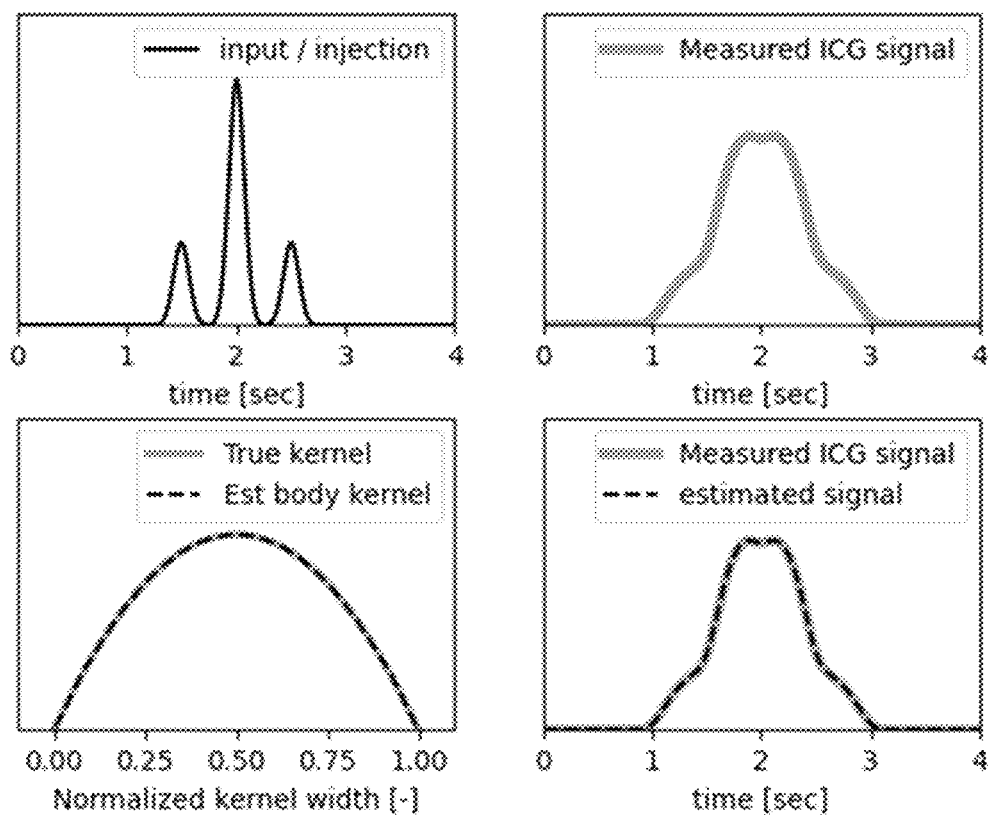
FIG. 13 shows an example of how to use an estimated body kernel to predict/estimate what the measured fluorescent output signal ('ICG signal') should look like based on knowledge of a previously estimated body kernel.

FIG. 13 shows another example of how to use an estimated body kernel to predict what the measured fluorescent output signal ('ICG signal') should look like by calculating an expected output signal (estimated signal'). In this example, the input signal is known (top left plot) and the estimated body kernel is known from the estimations shown in FIG. 11 and FIG. 12. In the plot on the bottom right, the estimated body kernel has been convolved with the input signal to obtain an estimated signal. The measured signal is further plotted to illustrate the usefulness of using the body kernel in the estimation. As observed, the measured signal closely resembles the estimated signal. Hence, once the body kernel has been estimated for a particular area of interest, this body kernel can be used to predict what the measured ICG signal is expected to look like, even when using different input signals than the input signal(s) used to estimate the body kernel. These plots have been generated using synthetic data for illustrative purposes only.

Figure 14:
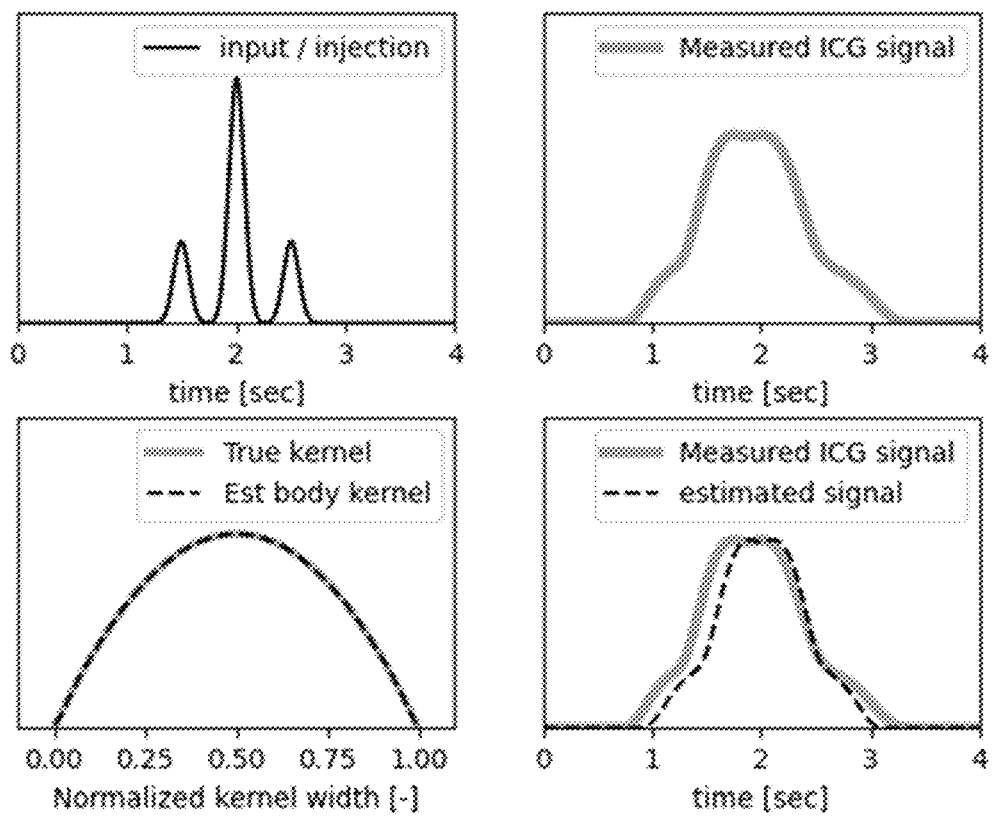
FIG. 14 shows the same input signal, body kernel, and estimated signal as the once shown in FIG. 13. However, in this scenario the measured signal differs from what we would normally expect from the related area of interest.

FIG. 14 shows the same input signal and the same body kernel, and thereby also estimated signal as the one shown in FIG. 13. However, in this example, the measured ICG signal (measured fluorescent output signal) differs from the expected signal, which is seen in the bottom right plot. Accordingly, in this scenario the measured signal differs from what we would normally expect from the related area of interest, which is an indication that the perfusion pattern from the tissue in said area is abnormal. Consequently, such tissue can be flagged as abnormal, and may be further investigated by the surgeon/doctor. These plots have been generated using synthetic data for illustrative purposes only.

Figure 15:
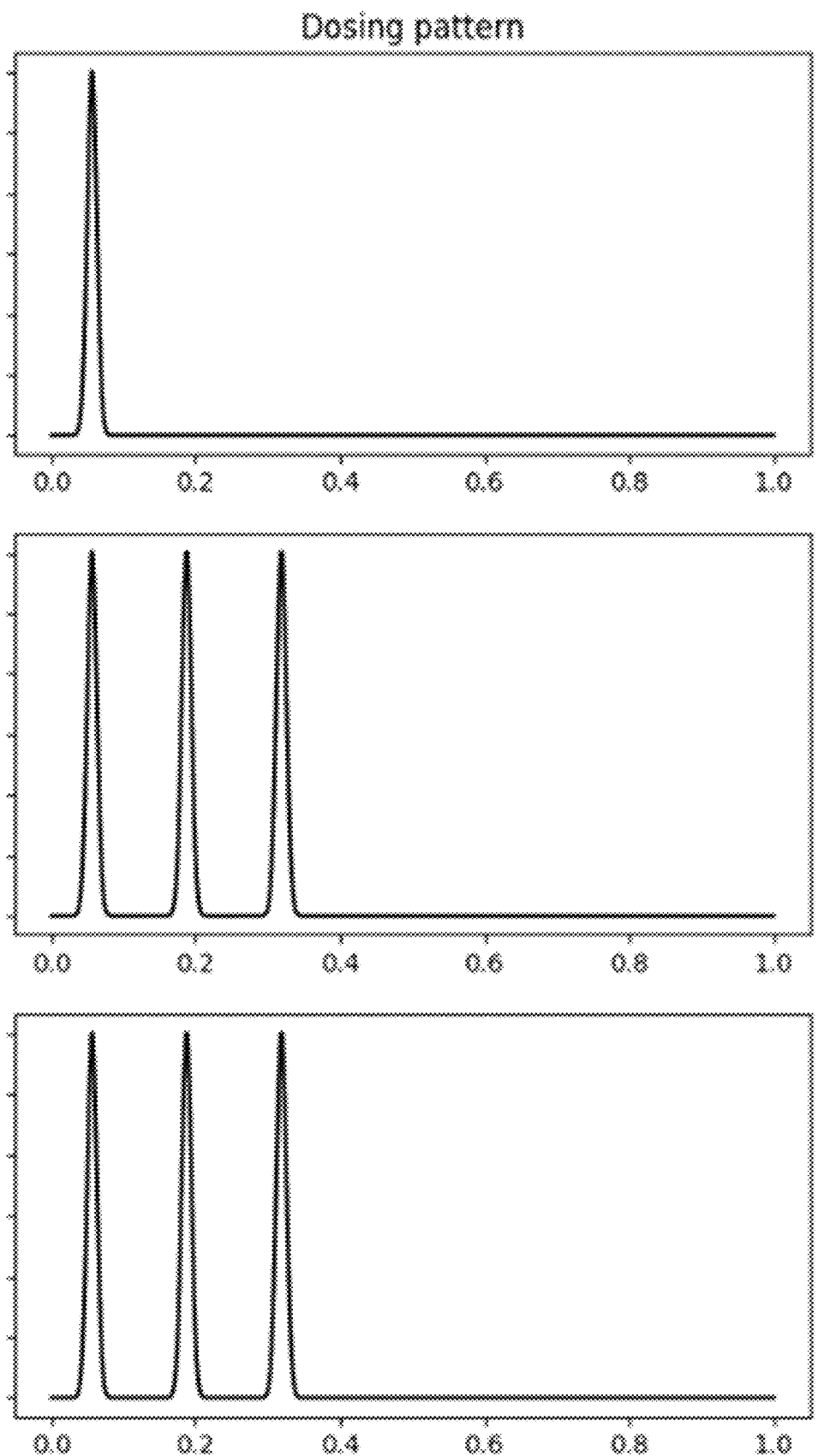
FIG. 15 shows an example of how a body kernel can be estimated for an area of interest and then used to estimate an expected ICG signal. The measured signal can be compared to the expected signal, whereby an abnormal perfusion pattern can be detected.
Figure 15:
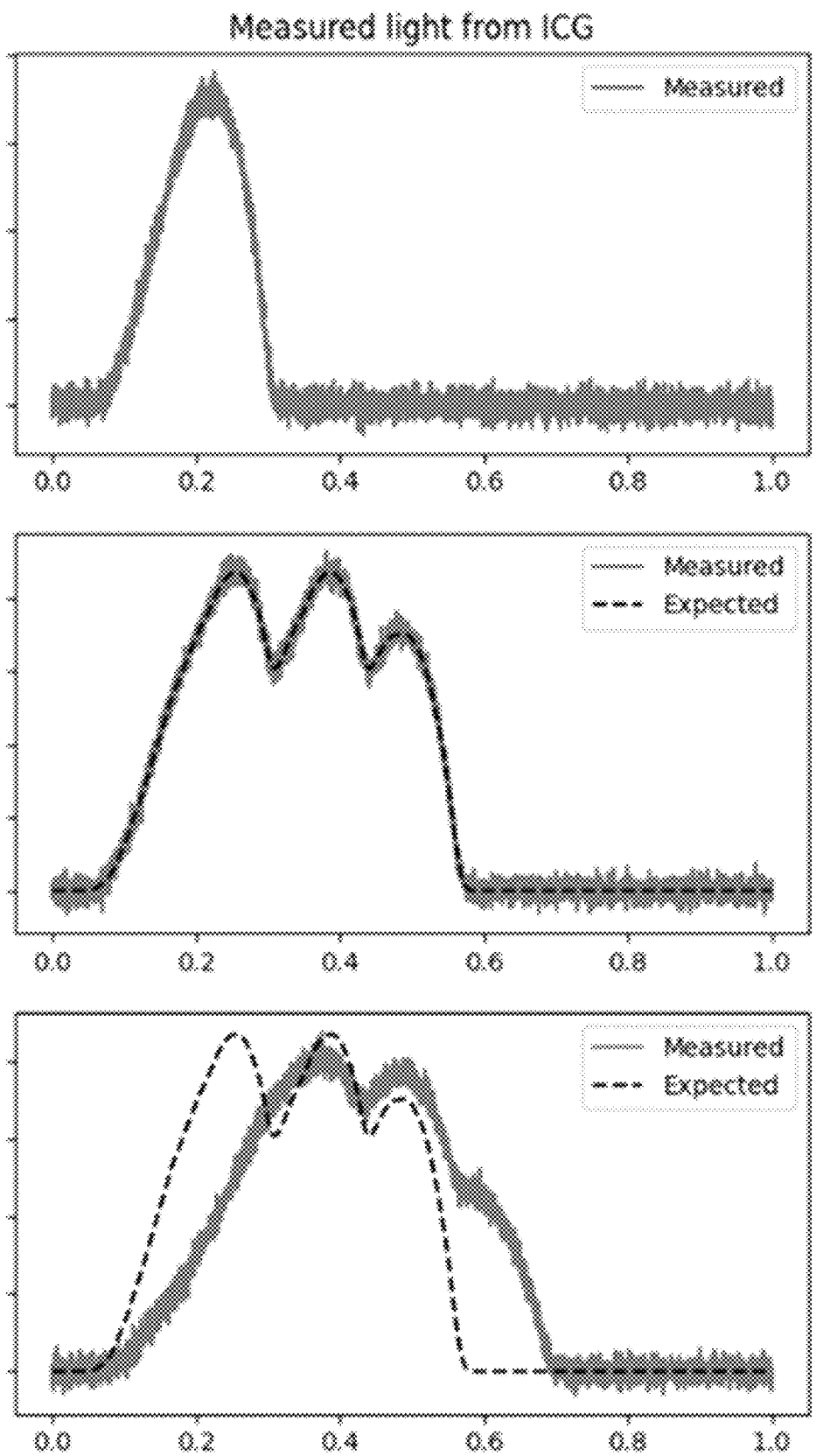
Figure 15:
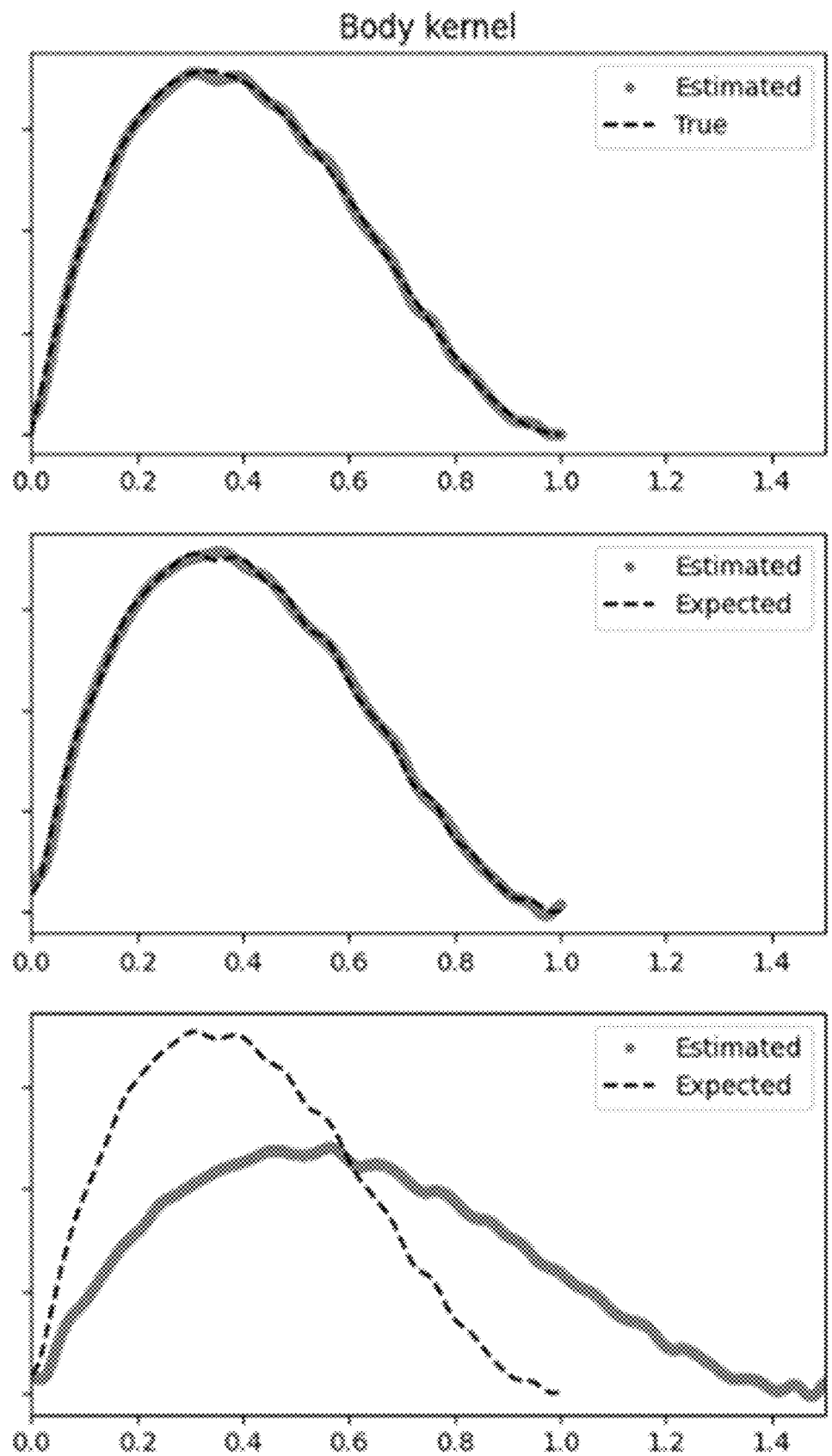

FIG. 15 shows another example of how a body kernel can be estimated for an area of interest and subsequently used to calculate an expected output signal. The actual measured signal can then be compared to the expected signal, whereby an abnormal perfusion pattern can be detected. The following references 'top left' etc. refers to the figure when viewed in landscape orientation. The top left plot shows an input signal (intensity vs time) comprising a single pulse, i.e. a single bolus injection. The top middle plot shows the measured fluorescent signal (intensity vs time), and the top right plot shows an estimated body kernel, which has been calculated by deconvolving the measured signal and the input signal. The perfusion pattern is identified as having a normal perfusion pattern. Once the body kernel for the area has been determined, it can be used in combination with other input signals (e.g. having another pattern of pulses) to generate expected output signals for the same or other tissue areas, and thereby look for tissue areas having an abnormal perfusion pattern. The bottom two rows show the measured signal (middle column) from an input signal comprising three pulses (left column). For the bottom two rows, the same body kernel (estimated in relation to the input signal comprising a single pulse in the top row and labelled as normal) has been used to generate an expected signal output signal. In the scenario depicted in the middle row, it can be observed that the measured signal aligns and correlates with the expected output signal, which indicates a normal perfusion pattern in the measured tissue area. However, in the scenario depicted in the bottom row, the measured output signal deviates significantly from the expected output signal, which indicates an abnormal perfusion pattern in the measured tissue area. Accordingly, the disclosed method can distinguish/classify tissue as having either normal or abnormal perfusion pattern, which can be used to flag/classify the tissue as either normal or abnormal. In this example, synthetic data (with noise on the measured signal) has been used, since the example serves an illustrative/explanatory purpose. Body kernels can continuously be calculated and thereby also be used for comparative purposes. This is illustrated in the right column in FIG. 15. In the middle row the graph in the right column shows the body kernel calculated and labelled as normal in comparison with the body kernel calculated from the measured signal in the middle column in the middle row, the two body kernels are seen to be similar. However, in the bottom row the body kernel calculated from the tissue area having an abnormal perfusion patterns ("Estimated") is seen to be very different from the body kernel labelled as normal ("Expected").

Figure 16:
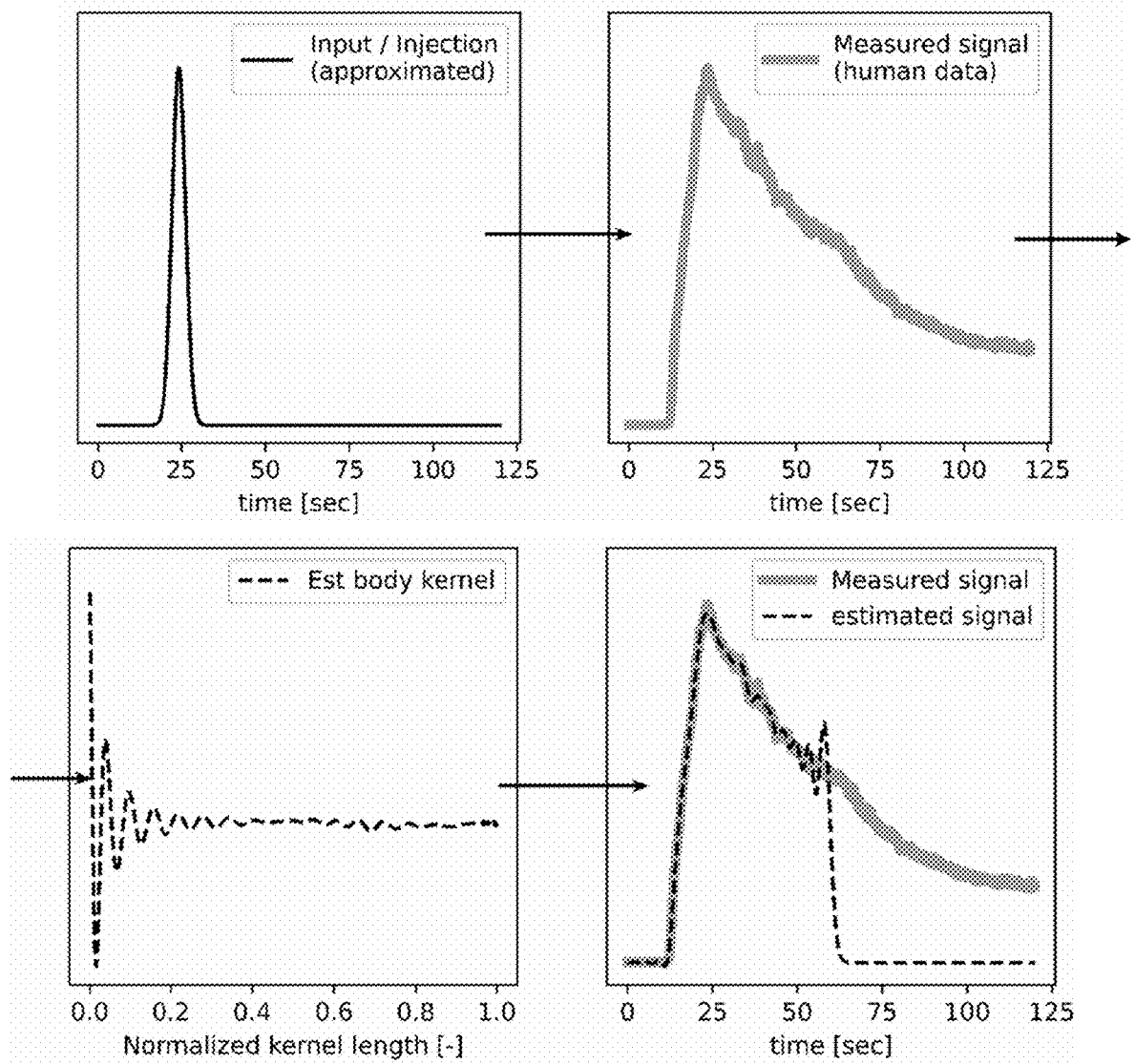
FIG. 16 shows an example of the presently disclosed method using real life data, i.e. data from a human being. In this example, the measured data was obtained from the forearm of the subject.

FIG. 16 shows an example of the presently disclosed method using real life data, i.e. data from a human being. The top left plot shows an input signal comprising a single pulse (i.e. corresponding to a single injection). Notice that the injection was done manually using a syringe, therefore this input signal is estimated/approximated. The true input signal is not known in this case. The top right plot shows the measured fluorescent output signal from the subject (intensity vs time). In this example, the measured data was obtained from the forearm of the subject. The bottom left plot shows an estimated body kernel pertaining to a region of interest on the forearm. The bottom right plot shows the measured signal with the estimated signal superimposed. It is observed that the measured signal correlates well with the estimated signal for a significant part of the signal, which indicates a normal perfusion pattern in the area of interest. The tail of the distribution can either be disregarded or one can obtain a more accurate body kernel or vary the input signal. A more accurate body kernel can be obtained by measuring for a longer time.

Figure 17:
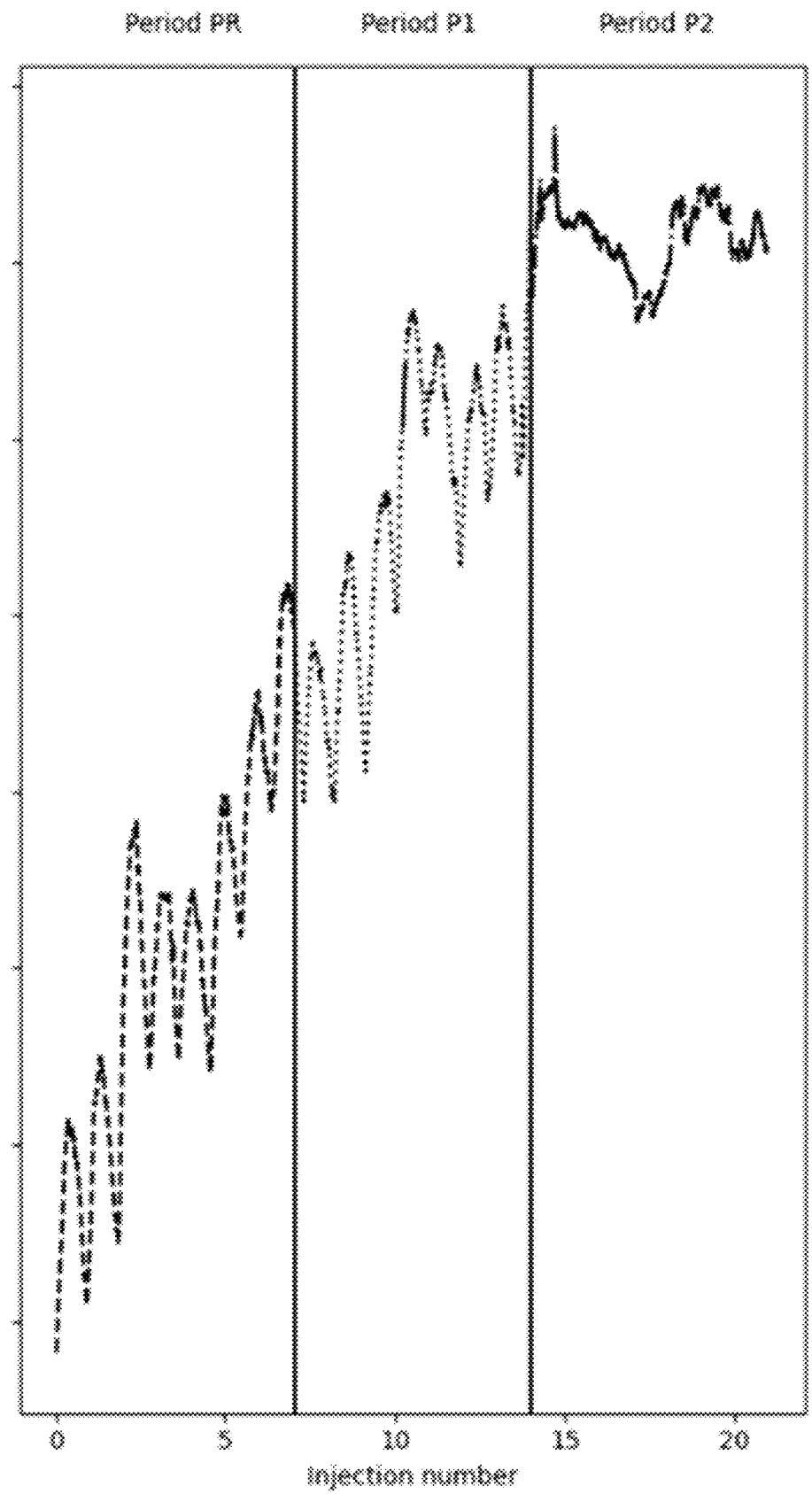
FIG. 17 shows one graph of a measured fluorescent output signal versus time, in three periods PR, P1, and P2, wherein a body kernel is determined from PR and used to calculated an expected output signal in P1 and P2. In P1 the expected output signal follows the measured fluorescent output signal, whereas in P2 there is a clear deviation due to ischemia.
Figure 17:
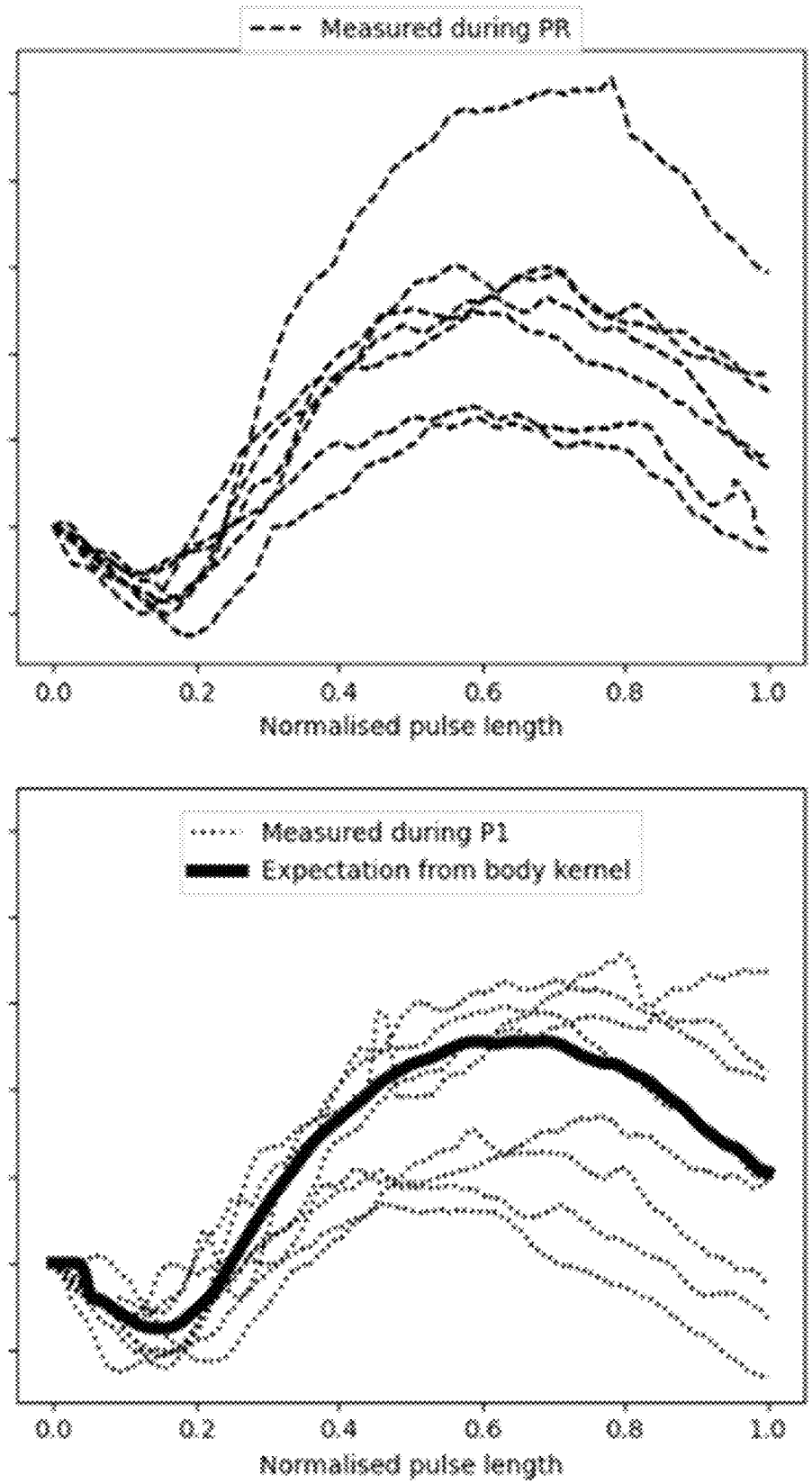
Figure 17:
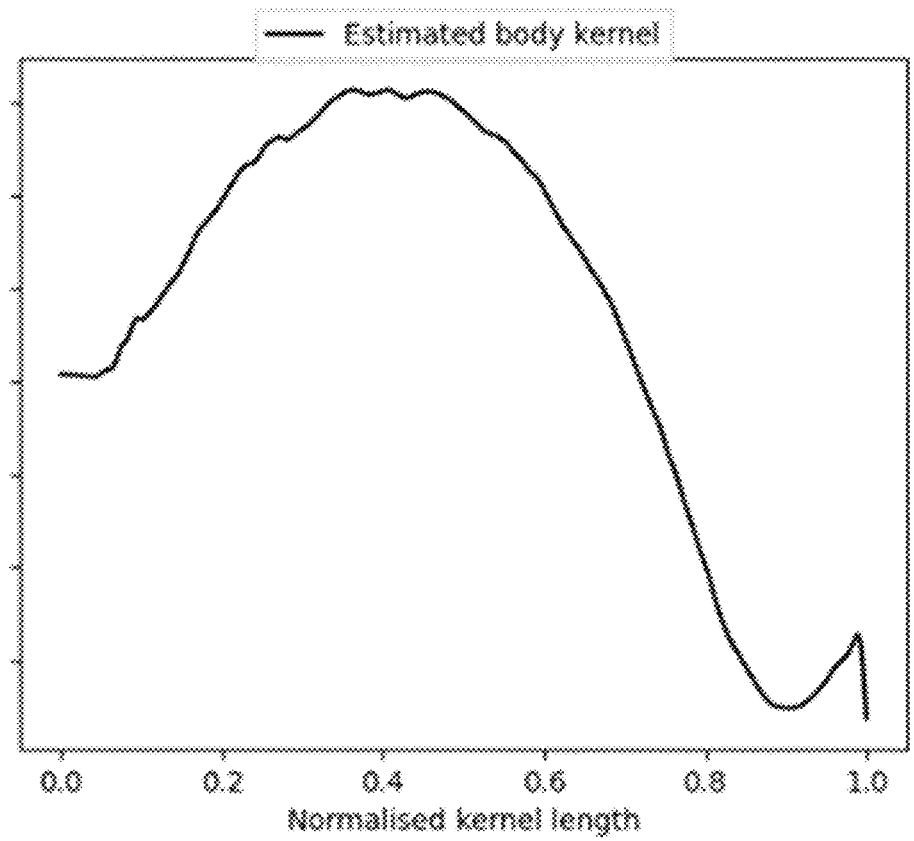
Figure 17:
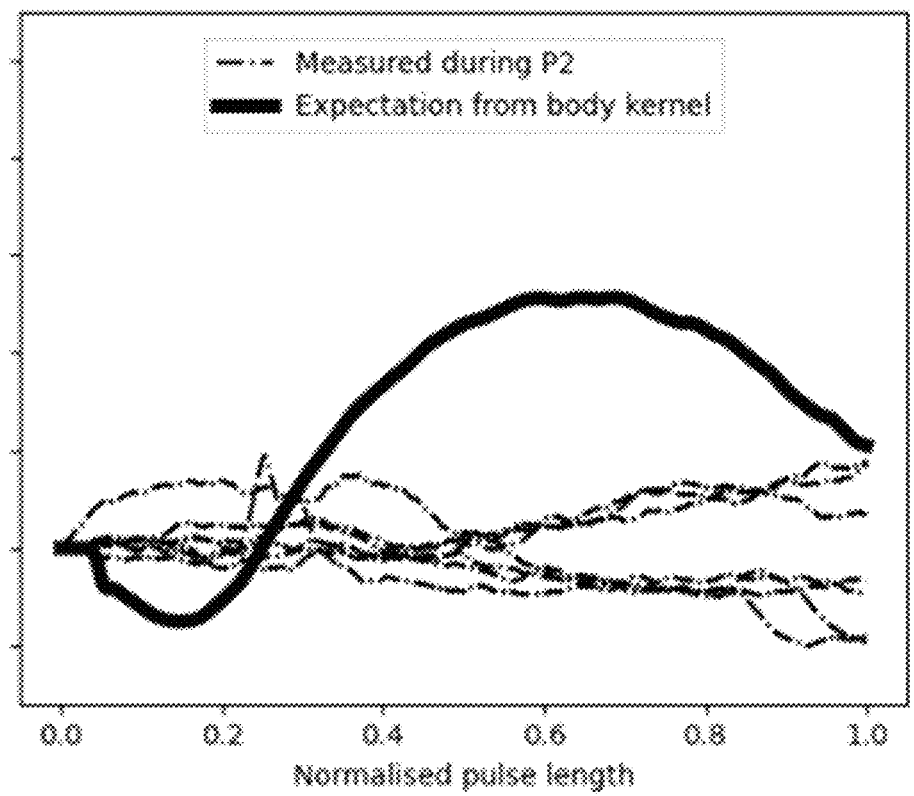

FIG. 17 shows to the right one graph of a measured fluorescent output signal versus time, in three periods PR, P1, og P2 from left to right. A body kernel is calculated based on the fluorescent output signal in period PR and a known input signal (now shown). The calculated body kernel is shown in the upper right corner of FIG. 17.

In period P1 the measured fluorescent output contains a number of pulses originating from corresponding bolus injections. In the upper graph in the middle column the fluorescent output pulses from P1 have been isolated and plotted together and normalized to the same pulse length (known from the input signal), and the pulses from P1 are seen to follow substantially the same pattern. In the upper graph in the middle column the fluorescent output pulses from P1 have been isolated and plotted together and normalized to the same pulse length, and also plotted together with an expected output signal calculated from the known input signal convolved with the calculated body kernel. The expected signal is seen to substantially follow the same pattern as the measured pulses. However, as seen in period P2 the expected output signal, calculated from the known input signal, is seen to match very poorly with the fluorescent output signal and an abnormal perfusion pattern can readily be detected, and the reason ischemia.

Further Details of the Invention
1. A computer implemented method for detecting (and/or identifying) one or more areas having an abnormal perfusion pattern in tissue of a subject, for example during a medical procedure, the method comprising the steps of:
    continuously acquiring fluorescence images of the tissue, wherein the fluorescence images are associated with a fluorescent output signal correlated with an input signal defined by a series of boluses of at least one fluorescent imaging agent, and wherein the series of boluses is administered with a predefined and/or controlled duration between subsequent boluses,
    analysing the fluorescence images,
    obtaining, defining and/or determining a normal perfusion pattern, at least in an intensity domain and/or in a time domain, and
    detecting, in the fluorescence images, possible tissue areas with abnormal (non-normal) perfusion pattern.
2. The method of item 1, wherein the duration between subsequent boluses is between 5 seconds and 5 or even 10 minutes over a time period of at least 2 or 3 minutes, or least 5 minutes or at least 10 minutes, or at least 15 minutes, or at least 30 minutes, or at least one hour.
3. The method according to any of the preceding items, comprising the step of obtaining at least a first body kernel which is the filter imposed by the subjects body on said at least one fluorescent imaging agent in a tissue area with a normal perfusion pattern.
4. The method according to any of the preceding items, comprising the step of obtaining at least a second body kernel which is the filter imposed by the subjects body on said at least one fluorescent imaging agent in a tissue area with an abnormal perfusion pattern.
5. The method according to any of the preceding items, wherein that the at least first body kernel and/or the at least second body kernel becomes at least one transfer function between the input signal and the fluorescent output signal.
6. The method according to any of the preceding items, comprising the step of identifying at least one tissue area with normal perfusion.
7. The method according to any of the preceding items, wherein the input signal is defined in terms of volume of fluorescent imaging agent vs. time.
8. The method according to any of the preceding items, comprising the step of identifying blood vessels in the fluorescence images.
9. The method according to any of the preceding items, wherein at least one tissue area with normal perfusion is identified manually, e.g. by a surgeon selecting a tissue area to have normal perfusion.
10. The method according to any of the preceding items, wherein a normal perfusion pattern is determined automatically.
11. The method according to any of the preceding items, comprising the step of measuring, preferably continuously measuring, the intensity, preferably the intensity vs. time, of the fluorescent output signal in a transcutaneous manner by other means than the image acquisition, for example using a photodiode and/or a light-diode finger clip.
12. The method according to item 11, wherein the transcutaneously measured intensity, such as the continuously measured intensity vs. time, is used to define a normal perfusion pattern.
13. The method according to any of the preceding items, comprising the step of obtaining at least one body kernel.
14. The method according to any of the preceding items 13, wherein the body kernel is the filter imposed by the subjects body on a fluorescent imaging agent in a tissue area with a normal perfusion pattern.
15. The method according to any of the preceding items 13-14, wherein the body kernel is the filter imposed by the subjects body on a fluorescent imaging agent in a tissue area with abnormal perfusion pattern.
16. The method according to any of the preceding items 13-15, wherein a body kernel is obtained by selecting at least one region of interest (ROI) in the fluorescence images corresponding to at least one tissue area, and deconvolving the ROI(s) relative to the input signal to determine a body kernel of the ROI(s), such that a convolution of the input signal with the body kernel corresponds to the fluorescent output signal from the tissue area(s).
17. The method according to any of the preceding items, comprising the step of calculating an expected output signal, preferably in at least one region of interest in the fluorescent images, based on the input signal.
18. The method according to any of the preceding items 17, wherein a tissue area with abnormal perfusion pattern is detected by comparing the fluorescent output signal of said tissue area with the expected output signal of said tissue area.
19. The method according to any of the preceding items 17-18, wherein the expected output signal is determined by convolving the input signal with an associated body kernel.
20. The method according to any of the preceding items, comprising the step of analysing a plurality of regions of interest (ROI) in the fluorescence images, the ROIs distributed over different tissue areas, and if the fluorescent output signals of a plurality of these ROIs are substantially similar and/or if associated body kernels of a plurality of these ROIs are substantially similar, one or more of these ROIs are defined as having normal perfusion patterns, thereby automatically defining and/or determining a normal perfusion pattern.
21. The method of any of the preceding items, wherein a sequence of the acquired fluorescence images are analysed and pixels in the fluorescence images are classified as either 1) artery, 2) vein, 3) tissue, or 4) otherwise, based on the phase of the fluorescent signal in the respective pixels relative to the input signal.
22. The method according to any of the preceding items, wherein one or more of the tissue areas detected as having a normal perfusion pattern based on the at least first body kernel and/or the at least second body kernel, are classified as muscular tissue, body fat, ligament tissue, vein, or artery, and wherein said classification is based on said at least one first body kernel being labelled.
23. The method according to any of the preceding items, wherein one or more of the tissue areas detected as having an abnormal perfusion pattern based on the at least first body kernel and/or the at least second body kernel, are classified as cancerous tissue, glandular tissue, tumor tissue, inflammatory tissue, or ischemic tissue, and wherein said classification is based on said at least one second body kernel being labelled.
24. The method according to any of the preceding items, wherein a tissue area with abnormal perfusion pattern is detected by comparing body kernels, such as by comparing the first and second body kernels.
25. The method according to any of the preceding items, wherein a tissue area with abnormal perfusion pattern is detected and/or classified by comparing the at least one second body kernel with one or more labelled body kernels.
26. The method of any of the preceding items, wherein a sequence of the acquired fluorescence images are analysed and pixels in the fluorescence images are classified as either 1) normally perfused tissue, 2) abnormally perfused tissue, or 3) otherwise, based on the phase of the fluorescent signal in the respective pixels relative to the input signal.
27. A computer implemented method for determining a perfusion related body kernel of tissue in a subject, the body kernel defined as the filter imposed by the subjects body on a fluorescent imaging agent, comprising the steps of:
continuously acquiring fluorescence images of the tissue, wherein the fluorescence images are associated with a fluorescent output signal correlated with an input signal defined by a series of boluses of said fluorescent imaging agent, and wherein the series of boluses is administered with a predefined and/or controlled duration between subsequent boluses,
selecting at least one region of interest (ROI) in the fluorescence images corresponding to a tissue area, and
deconvolving the ROI relative to the input signal to determine a body kernel of the ROI, such that a convolution of the input signal with the body kernel corresponds to the fluorescent output signal from the tissue area.
28. The method of any of the preceding items 27, wherein the duration between subsequent boluses is selected in accordance with the type of tissue of the ROI.

29. The method of any of the preceding items 27-28, wherein the body kernel is the filter imposed by the subjects body on a fluorescent imaging agent in a tissue area with normal perfusion pattern.

30. The method of any of the preceding items 27-28, wherein the body kernel is the filter imposed by the subjects body on a fluorescent imaging agent in a tissue area with abnormal perfusion pattern.

31. The method according to any of the preceding items 27-29, comprising the step of calculating an expected output signal by convolving the input signal with the body kernel.

32. The method of any of the preceding items 1-21, further comprising the steps of
determining a body kernel of at least one ROI according to the method of any of items 27-31,
convolving the input signal with the body kernel thereby defining a normal perfusion pattern of said ROI.

33. A computer implemented method for establishing a time domain perfusion reference of a subject, comprising the steps of:
continuously measuring a fluorescent output signal correlated with an input signal defined by a series of boluses of said fluorescent imaging agent, and wherein the series of boluses is administered with a predefined and/or controlled duration between subsequent boluses, and
defining the subject specific time domain perfusion reference as the fluorescent output signal vs. time.

34. The method according to any of the preceding items 33, wherein the fluorescent output signal is measured in a transcutaneous manner, for example by using a light-diode finger clip.

35. The method according to any of the preceding items 33-34, wherein an intensity of the fluorescent output signal is measured by means of a photodiode.

36. The method according to any of the preceding items 33-35, comprising the step of analysing the fluorescent output signal, for example detecting least one peak fluorescent signal for each bolus.

37. The method according to any of the preceding items 33-36, wherein the subject specific time domain perfusion reference is defined as the time difference between bolus injection and corresponding peak fluorescent output signal.

38. The method of any of the preceding items 1-21, further comprising the steps of
establishing a time domain perfusion reference of the subject according to the method of any of items 33-37,
correlating the analysis of the fluorescence images with the time domain perfusion reference thereby identifying a normal perfusion pattern.

39. The method according to any of the preceding items, comprising the step of analysing at least part of the fluorescence images/signal and determining at least one time difference selected from the group of:
time difference between bolus injection and artery fluorescent signal or vein fluorescent signal or tissue fluorescent signal,
time difference between artery fluorescent signal and vein fluorescent signal, and
time difference between artery fluorescent signal or vein fluorescent signal and tissue fluorescent signal, and
continuously identifying tissue and/or blood vessels in the fluorescence images based on said time difference(s) and the fluorescent output signal.

40. The method of any of the preceding items, wherein a series of boluses of at least one fluorescent imaging agent is provided into a vein of the subject during the image acquisition thereby generating the input signal, and wherein the series of boluses is administered with a predefined duration between subsequent boluses.

41. The method of any the preceding items, wherein the fluorescent imaging agent is Indocyanine green (ICG) and wherein each bolus of ICG corresponds to less than 0.01 mg ICG/kg body weight.

42. The method of any the preceding items, wherein the fluorescent imaging agent is ICG and wherein each bolus of ICG corresponds to less than 0.005 mg ICG/kg body weight.

43. The method of any the preceding items, wherein the fluorescent imaging agent is ICG and wherein each bolus of ICG corresponds to less than 0.004 mg ICG/kg body weight, more preferably less than 0.003 mg ICG/kg body weight, even more preferably less than 0.002 mg ICG/kg body weight, most preferably less than 0.001 mg ICG/kg body weight.

44. The method of any of the preceding items, wherein the series of boluses is injected automatically by a controllable injection pump.

45. The method according to any of the preceding items, wherein the imaged tissue is part of an anatomical structure in the gastrointestinal tract, preferably selected from the buccal cavity; pharynx; the small intestine including duodenum, jejunum, and ileum; the stomach, including esophagus, cardia, and pylorus; the large intestine including cecum, colon, rectum and the anal canal.

46. The method according to any of the preceding items, wherein the imaged tissue is subject to peristaltic movement during the medical procedure.

47. The method according to any of the preceding items, wherein the imaged tissue is part of an internal organ of the subject, or part of the skin of the subject, or part of a wound of the subject.

48. The method of any of the preceding items, wherein the images are acquired during thyroid surgery and wherein blood vessels in one or more of the parathyroid glands are identified and visualized to medical personnel involved in the surgery.

49. The method according to any of the preceding items, wherein at least two fluorescent imaging agents are used to generate two different fluorescent signals simultaneously.

50. The method according to item 49, wherein the at least two fluorescent imaging agents have different emittance wavelengths, and wherein the fluorescence images are acquired from at least two different depths of the tissue simultaneously.

51. The method according to item 50, wherein the at least two different depths are separated by at least 1 cm, preferably at least 1.5 cm.

52. The method according to any of the preceding items, wherein the fluorescent imaging agent(s) are attached to a non-normal tissue targeting molecule (e.g. a tumor-targeting molecule).

53. The method according to any of the preceding items, wherein the at least one fluorescence imaging agent is selected from the group of: indocyanine green (ICG), infracyanine gren (IfCG), brilliant blue green (BBG), and bromophenol blue (BPB), fluorescein isothiocyanate, rhodamine, phycoerythrin, phycocyanin, allophycocyanin, ophthaldehyde, fluorescamine, rose Bengal, trypan blue, fluoro-gold, green fluorescence protein, a flavin, methylene blue, porphysomes, cyanine dye, IRDDye800CW, CLR 1502 combined with a targeting ligand, OTL38 combined with a targeting ligand, or a combination thereof.

54. A computer program having instructions which, when executed by a computing device or computing system, cause the computing device or computing system to carry out the method according to any of the preceding items.

55. A system for identifying abnormal perfusion pattern in tissue of a subject, for example during a medical procedure, the system configured for
continuously acquiring fluorescence images of the tissue, wherein the fluorescence images are associated with a fluorescent output signal correlated with an input signal defined by a series of boluses of at least one fluorescent imaging agent, and wherein the series of boluses is administered with a predefined and/or controlled duration between subsequent boluses,
analysing the fluorescence images,
identifying, in the fluorescence images, at least one tissue area with normal perfusion, based on said analysis,
defining a normal perfusion pattern in an intensity domain and in a time domain, and
detecting, in the fluorescence images, possible tissue areas with an abnormal (non-normal) perfusion pattern.

56. The system according to item 55, comprising a controllable injection pump for holding at least one first fluorescence imaging agent, the injection pump being configured for injecting a series of predefined boluses of said first fluorescence imaging agent into a vein of the subject, thereby generating the input signal.

57. The system according to any of items 55-56, wherein the fluorescence agent is ICG and wherein the amount of ICG in a predefined bolus is less than 0.005 mg/kg body weight and wherein the system is configured to inject boluses with an interval of between 5 seconds and 10 minutes.

58. The system according to any of items 55-57, wherein the system is configured for carrying out the steps of any of items 1-53.

The invention claimed is:
1. A computer implemented method for detecting one or more areas having an abnormal perfusion pattern in tissue of a subject during a medical procedure, the method comprising:
continuously acquiring fluorescence images of the tissue, wherein the fluorescence images are associated with a fluorescent output signal correlated with an input signal defined by a series of boluses of at least one fluorescent imaging agent, and wherein the series of boluses is administered with a predefined and controlled duration between subsequent boluses,
analyzing the fluorescence images,
obtaining, defining and/or determining a normal perfusion pattern, at least in an intensity domain and/or in a time domain, and
obtaining at least a first body kernel which is the filter imposed by the subjects body on said at least one fluorescent imaging agent in a tissue area with a normal perfusion pattern, and/or
obtaining at least a second body kernel which is the filter imposed by the subjects body on said at least one fluorescent imaging agent in a tissue area with an abnormal perfusion pattern,
such that the at least first body kernel and/or the at least second body kernel becomes at least one transfer function between the input signal and the fluorescent output signal,
detecting, in the fluorescence images, possible tissue areas with an abnormal perfusion pattern based on the at least first body kernel and/or the at least second body kernel.

2. The method of claim 1, wherein the duration between subsequent boluses is between 5 seconds and 5 minutes, or up to 10 minutes, over a time period of at least 2, or at least 3, or at least 5 minutes and wherein the input signal is defined in terms of volume of fluorescent imaging agent vs. time.

3. The method of claim 1, comprising the step of identifying at least one tissue area with normal perfusion and determining the normal perfusion pattern therefrom.

4. The method of claim 1, comprising the step of automatically determining and defining a normal perfusion pattern, at least in a time domain.

5. The method of claim 1, comprising the step of continuously identifying blood vessels in the fluorescence images, such that identified blood vessels are excluded from the assessment of normal and abnormal perfusion patterns in tissue.

6. The method of claim 1, wherein at least one tissue area with normal perfusion is identified manually, e.g. by a surgeon selecting a tissue area to have normal perfusion.

7. The method of claim 1, comprising the step of continuously measuring the intensity vs. time of the fluorescent output signal in a transcutaneous manner by other means than the image acquisition, and wherein the transcutaneously measured intensity vs. time, is used to define a normal perfusion pattern.

8. The method of claim 1, wherein a body kernel is obtained by selecting at least one region of interest (ROI) in the fluorescence images corresponding to at least one tissue area, and deconvolving the ROI(s) relative to the input signal to determine a body kernel of the ROI(s), such that a convolution of the input signal with the body kernel(s) corresponds to the fluorescent output signal from the tissue area(s).

9. The method of claim 1, comprising the step of calculating at least one expected output signal based on the input signal and the body kernel(s).

10. The method of claim 9, wherein a tissue area with abnormal perfusion pattern is detected by comparing the fluorescent output signal of said tissue area with the expected output signal of said tissue area.

11. The method of claim 1, comprising the step of classifying a tissue area detected as having an abnormal perfusion pattern by utilizing a plurality of labelled body kernels.

12. The method of claim 1, wherein a tissue area with abnormal perfusion pattern is detected by comparing the first and second body kernels.

13. The method of claim 1, wherein a tissue area with abnormal perfusion pattern is detected and/or classified by comparing the at least one second body kernel with one or more labelled body kernels.

14. The method of claim 1, comprising the step of analysing a plurality of regions of interest (ROI) in the fluorescence images, the ROIs distributed over different tissue areas, and if the fluorescent output signals of a plurality of these ROIs are substantially similar and/or if associated body kernels of a plurality of these ROIs are substantially similar, one or more of these ROIs are defined as having normal perfusion patterns.

15. The method of claim 1, wherein the at least one fluorescence imaging agent is selected from the group of: indocyanine green (ICG), infracyanine green (IfCG), brilliant blue green (BBG), and bromophenol blue (BPB), fluorescein isothiocyanate, rhodamine, phycoerythrin, phycocyanin, allophycocyanin, ophthaldehyde, fluorescamine, rose Bengal, trypan blue, fluoro-gold, green fluorescence protein, a flavin, methylene blue, porphysomes, cyanine dye, IRDDye800CW, CLR 1502 combined with a targeting ligand, OTL38 combined with a targeting ligand, or a combination thereof.

16. The method of claim 1, wherein the fluorescence agent is ICG and wherein the amount of ICG in a predefined bolus is less than 0.005 mg/kg body weight and wherein boluses are injected with an interval of between 5 seconds and 5 minutes.

17. The method of claim 1, wherein one or more of the tissue areas detected as having a normal perfusion pattern based on the at least first body kernel and/or the at least second body kernel, are classified as muscular tissue, body fat, ligament tissue, vein, or artery, and wherein said classification is based on said at least one first body kernel being labelled.

18. The method of claim 1, wherein one or more of the tissue areas detected as having an abnormal perfusion pattern based on the at least first body kernel and/or the at least second body kernel, are classified as cancerous tissue, glandular tissue, tumor tissue, inflammatory tissue, or ischemic tissue, and wherein said classification is based on said at least one second body kernel being labelled.

19. A computer implemented method for determining a perfusion related body kernel of tissue in a subject, the body kernel defined as the filter imposed by the subjects body on a fluorescent imaging agent, comprising the steps of:
continuously acquiring fluorescence images of the tissue, wherein the fluorescence images are associated with a fluorescent output signal correlated with an input signal defined by a series of boluses of said fluorescent imaging agent, and wherein the series of boluses is administered with a predefined and/or controlled duration between subsequent boluses,
selecting at least one region of interest (ROI) in the fluorescence images corresponding to a tissue area, and
deconvolving the ROI relative to the input signal to determine a body kernel of the ROI, such that a convolution of the input signal with the body kernel corresponds to the fluorescent output signal from the tissue area, and such that said body kernel becomes a transfer function between the input signal and the fluorescent output signal.

20. The method of claim 19, wherein the body kernel is the filter imposed by the subjects body on a fluorescent imaging agent in a tissue area with normal perfusion pattern, or wherein the body kernel is the filter imposed by the subjects body on a fluorescent imaging agent in a tissue area with an abnormal perfusion pattern.

21. A system for determining a perfusion related body kernel of tissue in a subject, the body kernel defined as the filter imposed by the subjects body on a fluorescent imaging agent, the system configured for executing the method of claim 19.

22. A system for identifying an abnormal perfusion pattern in tissue of a subject, during a medical procedure, comprising a controllable injection pump for holding at least one first fluorescence imaging agent, the injection pump being configured for injecting a series of predefined boluses of said first fluorescence imaging agent into a vein of the subject, thereby generating an input signal, the system configured for executing the method of claim 1.

* * * * *